United States Patent
Schmidt et al.

(10) Patent No.: US 7,788,892 B2
(45) Date of Patent: Sep. 7, 2010

(54) USER INTERFACE AND CONTROL FOR CUTTING REEL SYSTEM

(75) Inventors: Mark Alvin Schmidt, Charlotte, NC (US); Ronald Lee Reichen, Raleigh, NC (US); Richard David Thier, Juneau, WI (US); Eric Alan Poulson, Paradise, UT (US); Donald Lewis Cripps, Smithfield, UT (US); John Michael Flenniken, Rock Hill, SC (US); Ezekiel A. Susman, Logan, UT (US)

(73) Assignee: Deere & Company, Moline, IL (US)

( * ) Notice: Subject to any disclaimer, the term of this patent is extended or adjusted under 35 U.S.C. 154(b) by 1697 days.

(21) Appl. No.: 10/840,901

(22) Filed: May 7, 2004

(65) Prior Publication Data

US 2005/0005586 A1   Jan. 13, 2005

Related U.S. Application Data

(60) Provisional application No. 60/486,050, filed on Jul. 10, 2003.

(51) Int. Cl.
*A01D 34/42* (2006.01)
(52) U.S. Cl. ....................................................... 56/249
(58) Field of Classification Search ................. 56/249, 56/294, 251, DIG. 20, 10.2 E
See application file for complete search history.

(56) References Cited

U.S. PATENT DOCUMENTS

| | | | |
|---|---|---|---|
| 4,021,996 A | 5/1977 | Bartlett et al. | |
| 4,205,797 A | 6/1980 | Bennett et al. | |
| 4,335,569 A | 6/1982 | Keeney et al. | |
| 4,412,212 A | 10/1983 | Kolegraff et al. | |
| 4,479,346 A | 10/1984 | Chandler | |
| 4,516,388 A * | 5/1985 | Chandler | 56/249 |
| 4,653,256 A | 3/1987 | Saiia | |
| 4,663,924 A | 5/1987 | Saiia | |
| 4,934,612 A | 6/1990 | Johnson | |

(Continued)

FOREIGN PATENT DOCUMENTS

DE   2101518 A   7/1972

(Continued)

*Primary Examiner*—Árpád Fábián-Kovács
(74) *Attorney, Agent, or Firm*—Erickson Law Group, PC

(57) ABSTRACT

A user interface and control system for adjusting the reel of a cutting reel unit includes a frame supported by at least one support element that is supported on, and is movable along, the ground. The system also includes a cutting reel, a bedknife, first and second actuators, a controller, and an operator input station, all carried on the frame. The reel and bedknife define a cutting line therebetween. The first actuator is adjustable to set a clearance between the reel and the bedknife. The second actuator is operatively connected between the frame and the bedknife to adjust the elevation of the cutting line to set a height-of-cut of the cutting reel. The controller is signal-connected to the first and second actuators, to adjust the actuators. The operator input station is signal-connected to the controller, the operator input station including a keypad portion and a display portion, wherein the clearance and the height-of-cut are indicated on the display portion and the clearance and the height-of-cut can be selectively changed via the controller by operator input to the keypad portion.

10 Claims, 17 Drawing Sheets

U.S. PATENT DOCUMENTS

| | | | |
|---|---|---|---|
| 5,018,342 A | 5/1991 | McClure et al. | |
| 5,031,335 A | 7/1991 | Kimmelman | |
| 5,083,976 A | 1/1992 | McClure et al. | |
| 5,197,267 A * | 3/1993 | Aldred et al. | 56/249 |
| 5,203,151 A * | 4/1993 | Mills | 56/17.2 |
| 5,241,810 A | 9/1993 | Reichen | |
| 5,291,724 A | 3/1994 | Cotton | |
| 5,343,680 A | 9/1994 | Reichen et al. | |
| 5,394,678 A | 3/1995 | Lonn et al. | |
| 5,406,778 A | 4/1995 | Lamb et al. | |
| 5,477,666 A | 12/1995 | Cotton | |
| 5,497,604 A * | 3/1996 | Lonn | 56/10.2 H |
| 5,678,396 A | 10/1997 | Thorman et al. | |
| 5,682,735 A | 11/1997 | Swenson et al. | |
| 5,704,199 A | 1/1998 | Paquet et al. | |
| 5,732,538 A | 3/1998 | Thorman et al. | |
| 5,839,321 A | 11/1998 | Siemons | |
| 5,865,016 A | 2/1999 | Toman | |
| 5,934,051 A | 8/1999 | Hahn | |
| 6,044,637 A | 4/2000 | Thier et al. | |
| 6,230,089 B1 * | 5/2001 | Lonn et al. | 701/48 |
| 6,318,059 B1 | 11/2001 | Cotton | |
| 7,114,318 B2 * | 10/2006 | Poulson et al. | 56/249 |
| 7,121,073 B2 * | 10/2006 | Schmidt et al. | 56/249 |
| 7,231,757 B2 * | 6/2007 | Poulson et al. | 56/249 |
| 7,353,644 B2 * | 4/2008 | Silbernagel | 56/249 |
| 7,370,461 B2 * | 5/2008 | Silbernagel | 56/249 |
| 7,377,092 B2 * | 5/2008 | Schmidt et al. | 56/249 |
| 2002/0095922 A1 | 7/2002 | Goman et al. | |
| 2004/0216436 A1 | 11/2004 | Schmidt et al. | |
| 2004/0216438 A1 | 11/2004 | Poulson et al. | |
| 2004/0216439 A1 | 11/2004 | Poulson et al. | |

FOREIGN PATENT DOCUMENTS

EP          0631906 A      4/1995

* cited by examiner

USER INTERFACE AND CONTROL FOR CUTTING REEL SYSTEM

This application claims the benefit of Provisional Application 60/486,050 filed Jul. 10, 2003.

TECHNICAL FIELD OF THE INVENTION

The invention relates to cutting reel units for mowers, and particularly, user interface and control systems for cutting reel mechanism, and methods for adjusting cutting reel units.

BACKGROUND OF THE INVENTION

Conventional mowing machines have an attached cutting reel unit or multiple units. Such machines typically move the cutting reel unit across the ground adjacent to the machine. Grass beneath the cutting reel unit is mowed as the machine travels forward. Conventional reel mower vehicles can include a plurality of arm members that extend from the vehicle, each arm having a cutting reel unit attached to its outer end portion.

The cutting reel units typically include front and rear skids or rollers that support or carry the cutting reel unit across the surface of the ground during mowing operation. Such vehicles and cutting reel units are disclosed for example in U.S. Pat. Nos. 5,343,680; 5,412,931 and 5,459,984.

Conventional cutting reel units provide a plurality of blades coupled together to form a generally cylindrical reel that rotates about a transverse axis. The blades pass in close proximity to a bedknife to create a scissoring action for cutting vegetation such as grass. A frame typically houses the reel and bedknife. Wheels, rollers or skids are coupled to the frame for engaging or rolling across the ground to operatively support the reel and bedknife at a predetermined height above the ground. The height at which grass is cut or "height-of-cut" is therefore determined by the height at which the wheels, rollers or skids carry a frame, reel and bedknife above the ground. Cutting reel units are typically used for mowing golf courses or other areas where an accurate cut is desirable.

To produce a high quality cut, and a cut that is even for multiple cutting reel units and across mowing passes by a machine with multiple cutting reel units, it is necessary that the height-of-cut for each cutting reel unit be properly adjusted. It is known that reel mowers have an adjustment mechanism for adjusting the reel mowing height.

For height-of-cut adjustments, there is a generally accepted and common method for determining a cutting reel unit's existing height-of-cut and how far it needs to be adjusted towards a targeted adjustment. The procedure for setting the cutting height typically involves fastening a gauge bar to the bedknife such that the upper surface of the bar is parallel to a forward, horizontal position of the bedknife and at the desired distance below the cutting edge of the bedknife. The front and rear rollers are then manually adjusted to come into contact with the upper surface of the gauge bar.

Cutting reel units cut properly only if the reel-to-bedknife clearance is properly adjusted. Currently, the reel-to-bedknife clearance is manually adjusted. The adjustment is made on a regular basis, typically before use, or made during or after use when poor cut quality is detected. Sometimes the adjustment is made such that the reel touches the bedknife and then the reel and bedknife are allowed to wear into place. Adjustments are also made after repair or replacement of the reel or bedknife.

Specifically, the reel-to-bedknife clearance is adjusted by moving the reel away from the bedknife to allow a specific gap—that is even across the length of the reel and bedknife—between both the reel and bedknife. The gap is then measured by inserting a feeler gauge (of the same thickness as the adjustment gap) between the reel and bedknife. The adjusted gap between the reel and bedknife is determined to be accurate when the feeler gauge can be moved smoothly between the reel and bedknife across the entire length of the reel and bedknife, such that there is only a slight drag of the feeler gauge as it is moved across this length. To verify reel and bedknife sharpness and a correct reel-to-bedknife adjustment, a single strip of paper is often inserted between the reel blade and bedknife while the reel is turned forward by hand. If the reel cuts the paper, the sharpness and adjustment are usually determined to be correct. The quality of the cut of the piece of paper across the single sheet can be examined to indicate whether the clearance is correct.

Reel adjustments are also necessary when a cutting reel unit is "re-tasked," in effect, adjusted for cutting another type of grass or grass to be cut to a different height. For example, a cutting reel unit could be re-tasked from an adjustment appropriate for a golf course fairway to adjustment appropriate for a golf course green, the two areas having different grass height requirements. However, re-tasking a cutting reel unit is time-consuming. This is especially true considering that for large area grass cutting, such as on a golf course, multiple cutting reel units are typically associated with each reel machine or vehicle. To avoid re-tasking cutting reel units, many golf courses have cutting reel units or cutting machines which remain designated or pre-adjusted for particular grass requirements, in effect, a designated group of cutting units for different areas of the golf course. This technique necessitates multiple cutting units or cutting machines. Multiple cutting units or machines can result in higher capital costs and maintenance costs.

The present inventors have recognized that proper mower adjustments such as height-of-cut and reel-to-bedknife clearance are time consuming, labor intensive and often hard to achieve through manual adjustment methods.

The present inventors have recognized that the adjustment time, and the accuracy and precision of these adjustments, can be improved through an automated adjustment system.

The present inventors have recognized that a need exists for dynamic adjustment capability for multi-area mowers or mowers that are capable of mowing multiple areas having different cutting requirements.

The present inventors have recognized the need to improve the adjustment process to ensure a shorter required adjustment time, ease of adjustment, and improved reel operation quality.

SUMMARY OF THE INVENTION

The invention provides a control system for adjusting the reel of a cutting reel unit. The cutting reel unit may be carried by, or attached to, a vehicle, such as a tractor, singularly or as one of a plurality of cutting reel units, or may be incorporated into a riding mower, a walking mower or a ride-on mower, also singularly or as one of a plurality of cutting reel units. The cutting reel can be one driven in rotation by one or more hydraulic motors, electric motors, by the traction drive of the mower machine or vehicle, or by other type drive.

The invention provides a user interface that is adapted for selecting and initiating reel adjustments, for selecting reel parameters or adjustments, for calibrating and re-tasking a reel unit or units, for inputting pre-selected adjustment values, and/or for making fine adjustments to pre-selected reel adjustments.

The control system can control reel-to-bedknife clearance, height-of-cut, lateral leveling of the reel, and the reel rotational speed.

The invention provides a control system for adjusting the reel of a cutting reel unit, that includes a cutting reel, a frame supported by at least one support element that is supported on, and is movable along, the ground, the frame supporting the cutting reel, a bedknife carried on the frame, at least one first actuator adjustable to set a clearance between the reel and the bedknife, a controller that is signal-connected to the actuator, to adjust the actuator; and an operator input station that is signal-connected to the controller, the operator input station or "user interface" comprising an input portion, such as a keypad portion, and a display portion, wherein the clearance is indicated on the display portion and the clearance can be selectively changed via the controller by operator input to the input portion.

According to another aspect of the invention, a control system can provide a height-of-cut adjusting system including a frame supported on at least one support element that is supported on, and is movable along, the ground, a cutting reel carried on the frame, a bedknife carried on the frame, the reel and the bedknife defining a cutting line therebetween, an actuator operatively connected between the frame and the bedknife and arranged to adjust the elevation of the cutting line to set a height-of-cut of the cutting reel unit, a controller that is signal-connected to the actuator, and an operator input station that is signal-connected to the controller, the operator input station or "user interface" comprising an input portion, such as a keypad portion, and a display portion, wherein the height-of-cut is indicated on the display portion and the height-of-cut is selectively changed by operator input on the input portion.

The control system can include the reel-to-bedknife adjusting system and the height-of-cut adjusting system, as described in the preceding two paragraphs, reel leveling by adjusting the height-of-cut independently on opposite ends of the reel, and reel rotational speed selection in one control system.

The operator input station can be permanently mounted with the controller to be transported with the cutting reel unit during operation.

The clearance and/or height-of-cut can be re-set to a predetermined value by the activation of a button on the input portion.

The clearance and/or height-of-cut can be selected from a list of selectable clearances and/or heights-of-cut displayed on the display portion using the input portion.

The clearance and/or height-of-cut can be manually changed by operator input to the input portion.

A contact sensor for sensing contact between the reel and the bedknife, can be provided wherein after the one selectable clearance is selected as the clearance, the controller is configured to instigate a routine wherein the reel and bedknife are brought together until contact is sensed by the contact sensor and then the controller adjusts the actuator to separate the reel from the bedknife by the clearance.

The input portion of the operator input station can include a reset or setup button which calibrates the position of the second actuator and a measured height-of-cut reference position. This position of the actuator is preferably the stalled position of the actuator wherein the bedknife is urged against a height-of-cut measuring bar.

The cutting reel unit control system can be implemented through a variety of control architectures such as distributed control or centralized control. The control protocol can be CAN, serial, or other control protocols.

The cutting reel unit control system can be automatically self-adjusting, which periodically corrects the reel adjustments such as the reel speed, the height-of-cut, the reel lateral leveling, and the reel-to-bedknife clearance. The control system can also automatically correct the reel-to-bedknife clearance if contact between the reel and bedknife is sensed during operation.

The cutting reel unit control system can be configured as a central controller or by controllers located at each cutting unit, or even by a local controller designated for each actuator. The operator input system can be mounted with the controller (s) on a mowing vehicle to be signal-connected on a permanent basis with the controller(s), or can be a separate operator input station that is connectable to multiple controllers to initiate adjustments, and can thereafter be disconnected from the controller(s) and removed from the mowing vehicle. The cutting reel unit control system can be adjusted after operator or automatic initiation of an adjustment routine in a central controller or by operator or automatic initiation of control routines performed by controllers at each cutting unit or at each actuator.

The cutting reel unit adjustment can be made by a controller external to the cutting unit, such as by a control unit that is used in a shop to re-adjust or re-task a cutting unit for a pre-selected grass condition or area and desired height-of-cut.

The disclosed invention provides advantages in that the apparatus and method allow for rapid and automatic adjustment of the reel-to-bedknife gap without operator intervention following operator initiation of the adjustment. The reel can be adjusted in seconds. The method has speed and consistency advantages over manual adjustment, and does not require detection of poor cut quality or excess surface wear in order to perform the automatic adjustment.

The disclosed invention provides advantages in that the apparatus and method allow for rapid and automatic adjustment of the height-of-cut of a reel of a cutting reel unit without operator intervention following operator initiation of the adjustment. The reel can be adjusted in seconds. The method has speed and consistency advantages over manual adjustment, and does not require detection of poor cut quality in order to perform the automatic adjustment.

By making these adjustments automatically, the reel adjustment process may be accomplished more consistently without the presence of a skilled mechanic. The automated adjustment also provides the capability for the support of autonomous equipment.

The control system allows a cutting reel unit or units to be rapidly re-tasked to cut different grass heights for different areas of a golf course. The system allows a single cutting reel unit to be readily usable for multiple golf course areas.

Numerous other advantages and features of the present invention will be become readily apparent from the following detailed description of the invention and the embodiments thereof, from the claims and from the accompanying drawings.

DETAILED DESCRIPTION OF THE PREFERRED EMBODIMENTS

Figure 1:
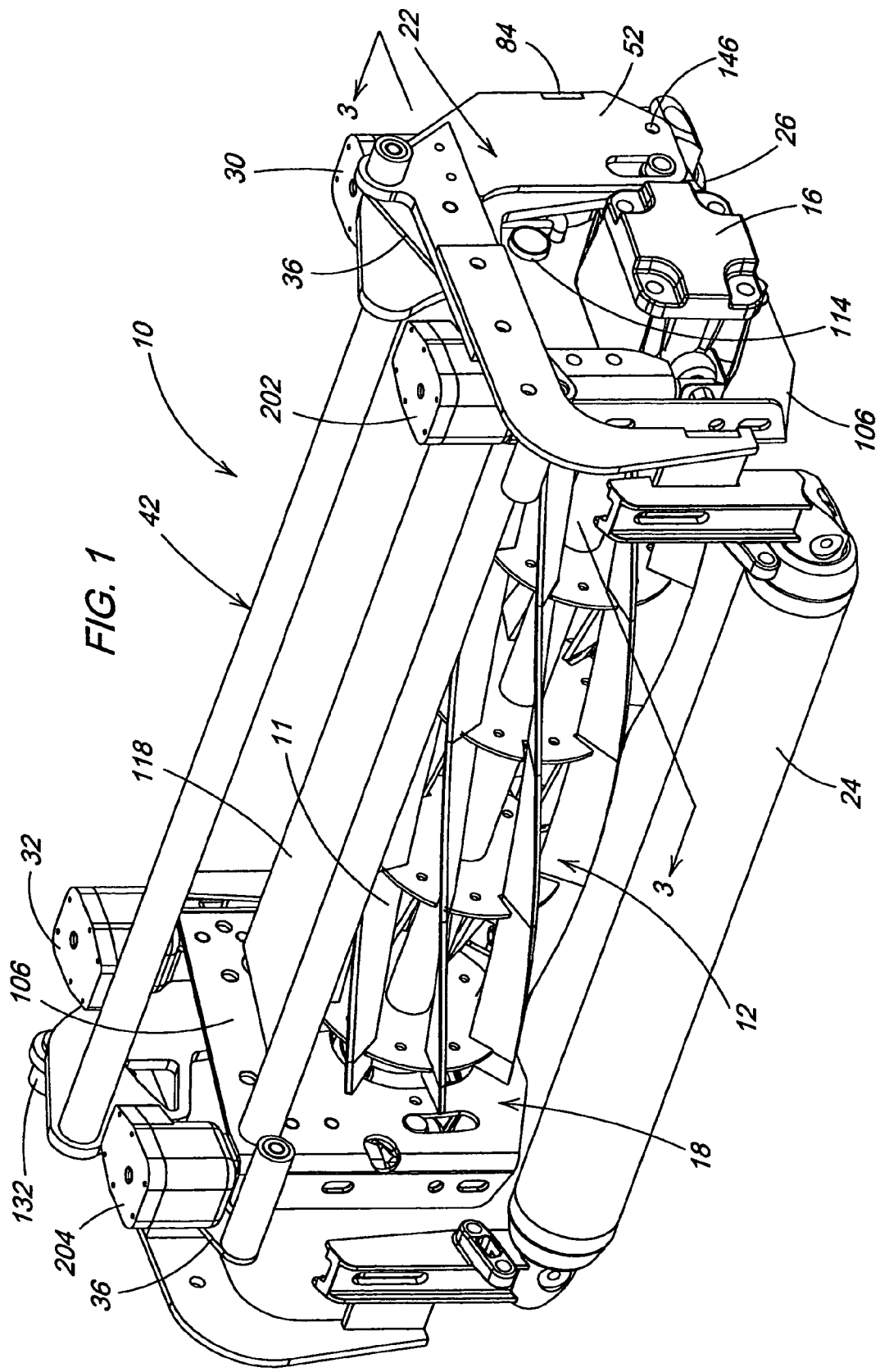
FIG. 1 is a perspective view of a cutting reel unit according to the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

Figure 2:
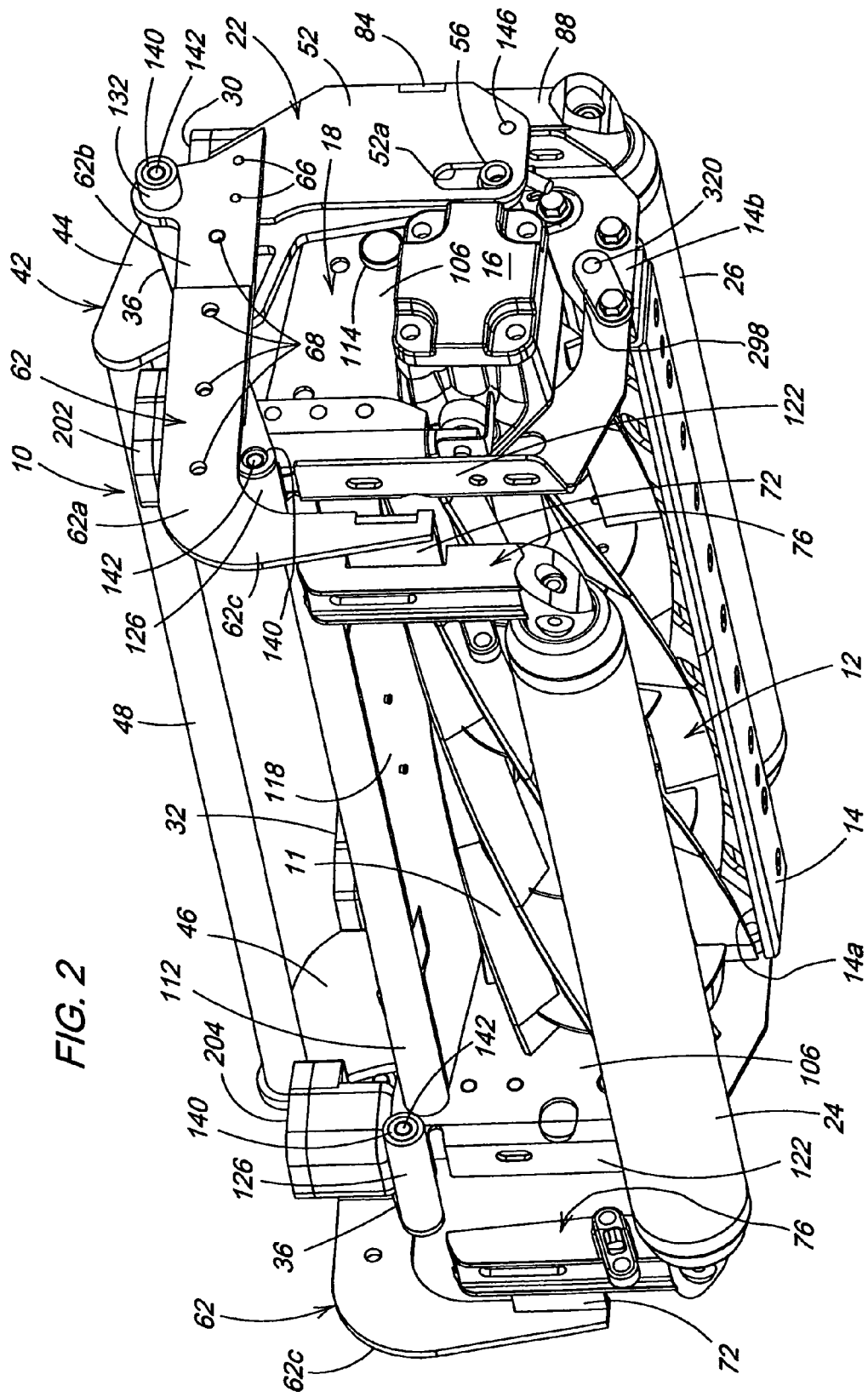
FIG. 2 is a bottom perspective view of the cutting reel unit of FIG. 1.

FIGS. 1 and 2 illustrate a mower cutting reel unit 10 according to the present invention. The mower cutting reel unit 10 is adapted to be pulled alone or within a group of like units by a vehicle such as described in U.S. Pat. Nos. 5,343,680; 5,412,931 or 5,459,984, herein incorporated by reference. A plurality of blades 11 are coupled together to form a generally cylindrical reel 12 which rotates about a transverse axis in close proximity to an edge 14a of a bedknife 14 (FIG. 2) for cutting vegetation, such as grass, with a scissoring action. A motor 16, carried at one side of a frame 18 that generally houses and supports the reel 12, drives the reel 12. The motor 16 can be a hydraulic, electric or other type motor. Alternatively, a transmission arrangement between the traction drive of the machine or vehicle and the reel can be used to rotate the reel. A hydraulic motor is indicated in the figures.

The inside frame 18 is carried by an outside frame 22. The outside frame 22 is supported on front and rear rollers 24, 26 respectively. The inside frame 18 is supported on the outside frame 22 by actuators 30, 32 and by struts 36, 36. The struts 36, 36 are substantially mirror-image identical in configuration. A pushing or towing frame 42 is arranged between the inner and outer frames 18, 22. The towing frame 42 includes vertical plates 44, 46 fastened to side plates 52, 54 of the outer frame 22 by pins 56, 58 residing in slots 52a, 54a. The slots 52a, 54a are part of a mechanism which permits the reel to be pushed from the rear when rolling, and still touch down heel first when lowered.

A crossbar 48 connects the side plates 44, 46. A vehicle connector or lift arm can be engaged at a select position along the crossbar 48 to tow or push the cutting unit 10 along the ground during the cutting operation.

The outside frame 22 also includes adjustable bracket members 62, 62 connected by fasteners 66 to a respective side plate 52, 54. The bracket members 62, 62 are substantially mirror-image identical in configuration. The members 62, 62 extend downward to be connected via plates 72, 72 to front support assemblies 76, 76 that are supported by the front roller 24. The front support assemblies 76, 76 are substantially mirror-image identical in configuration.

Plates 84, 84 connect the outer frame side plates 52, 52 to rear support assemblies 88, 88 that are supported by ends of the rear roller 26. The rear support assemblies 88, 88 are substantially mirror-image identical in configuration.

The inside frame 18 includes side plates 106, 106 connected together by crossbars 112, 114. The side plates 106, 106 are substantially mirror-image identical in configuration. A grass deflector plate 118 is arranged between the bars 112, 114 above the reel 12. The side plates each include a front flange 122. A tube 126 is welded to each of the front flanges 122. A tube 132 is also welded to each of the members 62b. Sleeve bearings 140 are fit into each tube and a pin, bolt or other fastener 142 is used to pivotally connect each of the angled struts 36 to a respective pair of tubes 126, 132.

FIG. 2 illustrates a detector 320 (described below) mounted on a plate 298 and positioned adjacent to an end wall 14b of the bedknife 14. An identical detector 320 can be installed in mirror-image fashion to an opposite end wall of the bed knife.

Figure 3:
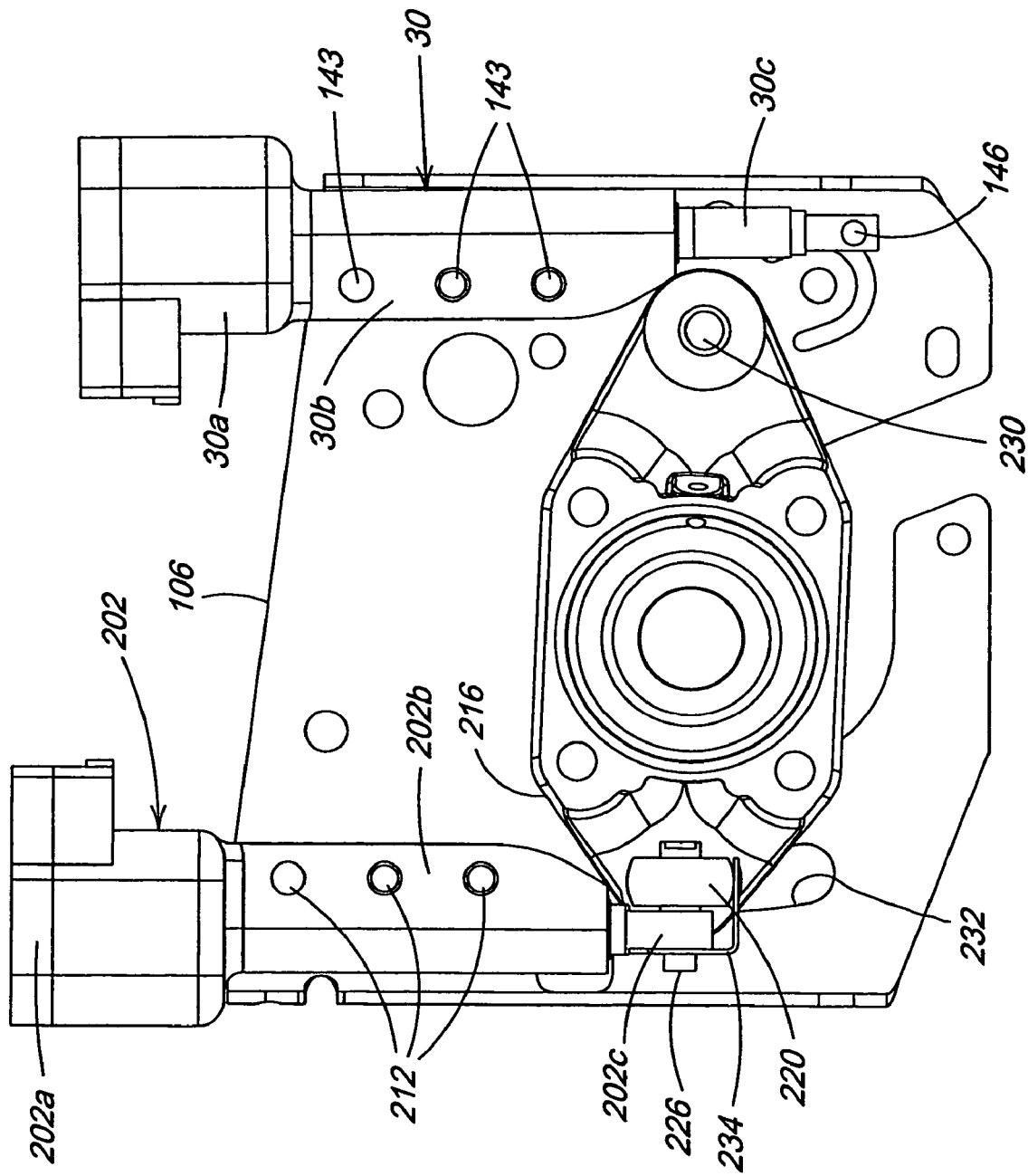
FIG. 3 is a fragmentary sectional view taken generally along line 3-3 of FIG. 1, with portions of the cutting unit removed for clarity of description, with the reel pivoted away from the bedknife.

FIG. 3 illustrates right side components of the unit 10. The left side components are configured in substantially the same, but mirror-image manner. The actuators 30, 32 each include a motor drive 30a, a housing 30b, and an actuator rod 30c extending out of a bottom of the housing 30b. The rod 30c extends or retracts vertically from the housing 30b by a selected turning direction of the motor drive 30a. The housing 30b is fastened to the respective side plate 106 by fasteners 143. The rod 30c is pivotally fastened to the outer frame 22, particularly to the respective outer frame side plate 52 by a fastener or pin 146.

Thus, extension of the rods 30c from the housings 30b, of the actuators 30, 32, lifts the inside frame 18 with respect to the outside frame 22. Retraction of the rod 30c into the housing 30b, of the actuators 30, 32, lowers the inside frame 18 with respect to the outside frame 22.

The struts 36, 36 (FIGS. 1 and 2) prevents excessive forward or rearward tipping of the inside frame 18 lifted or lowered at the rear thereof and ensures a substantially straight vertical lifting or lowering of the inside frame 18. The geometry of the frames 18, 22, struts 36, 36 and actuators 30, 32 advantageously slightly tip the reel and bedknife forward with rising height-of-cut. This change in the "angle of attack" results in a more effective cutting.

Actuators 202, 204 are provided on a front side of the inside frame 18 adjacent opposite ends of the reel 12. As illustrated in FIG. 3, the actuators each include a motor actuator 202a, a housing 202b, and an actuator rod 202c. The housing 202b is fastened to the respective side plate 106 by fasteners 212. The rods 202c, 202c are fastened to respective reel bearing housings 216, 216 that journal the reel 12 at opposite ends of the inside frame 18. Each rod 202c is pinned to a ball joint 220 that is fixed to the respective housing 216, by an elongated pin 226.

Figure 4:
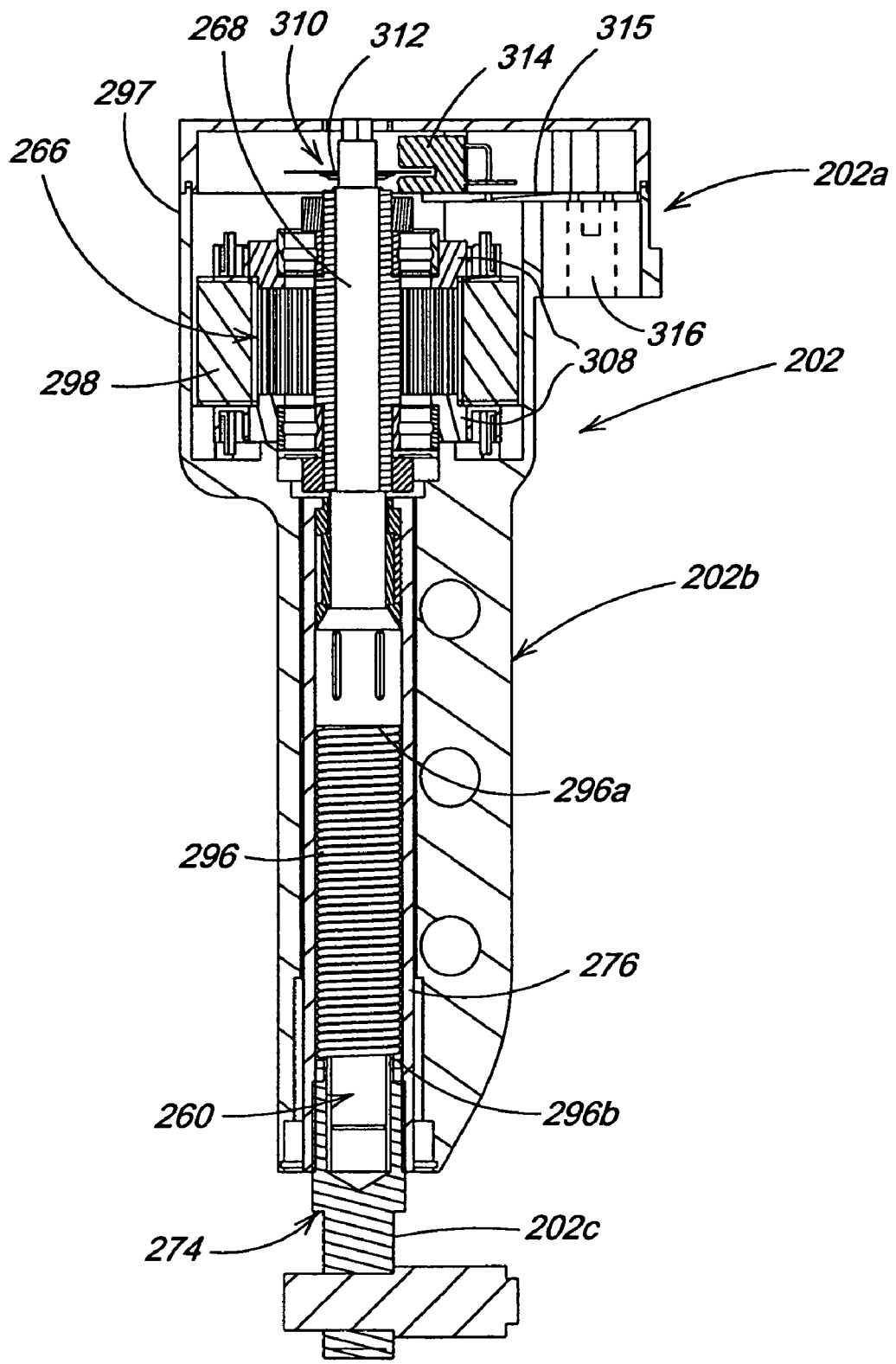
FIG. 4 is a sectional view of an actuator as shown in FIG. 3.

Each reel bearing housing 216 is pinned to a respective side plate 106 by a pin or fastener 230. The extension or retraction of the rods 202c, 202c with respect to the housings 202b, 202b of the actuators 202, 204, pivots the reel bearing housings 216, 216 about the pins or fasteners 230, 230. As illustrated in FIG. 4, by extending the rods 202c, 202c and pivoting the reel housings 216, 216, the blades 11 can be brought closer to or further from the bedknife 14 (FIG. 2), particularly, closer to or further from an edge 14a of the bedknife 14.

FIG. 4 illustrates a typical actuator 30, 32, 202, 204 such as the actuator 202. The actuator 202 includes the motor drive 202a, the housing 202b and the rod 202c. Inside the housing 202b there is a drive screw or lead screw 260 that is driven into rotation by a stepper motor 266 of the motor drive 202a. The lead screw 260, being an extension of a motor shaft 268, is rotated by the stepper motor 266.

The rod 202c is a substantially hollow cylinder and includes a rod end portion 274 fixed to a rod body portion 276 by threaded mutual engagement. The lead screw 260 extends substantially through the body portion 276. A lead nut 280 is fixed to the rod body portion 276. An anti-backlash nut 288 is threaded onto the lead screw 260. The anti-backlash nut 288 also includes Acme threads, preferably plastic, and engaged to the external threads of the lead screw 260. The anti-backlash nut 288 includes a convex conical tapered surface 290 which abuts a concave conical tapered surface 292 of the rod body portion 276 or the lead nut 286 fixed to the rod body portion 276.

A coil spring 296 surrounds the lead screw 260. The coil spring 296 is connected to the anti-backlash nut at one end 296a and to the rod end portion 274 at an opposite end 296b.

The anti-backlash nut 288 and the spring 296 can be eliminated in the actuators 30, 32 where fine positioning accuracy is not required. The anti-backlash feature is most advantageous for the actuators 202, 204 where fine positioning accuracy is desired.

The motor drive 202a includes a casing 297 that encloses windings 298, bearings 308, and an optical encoder 310. The encoder 310 includes a target disk 312 and a read head 314. The read head 314 includes two spaced-apart light emitting and reading devices, used to determine position of the rotating target disk and also its direction of rotation. The read head 314 is signal-connected to a circuit board 315 that is signal-connected via a plug 316 and a cable or wiring to the controller 300.

To set absolute position of the rod, the rod can be extended or retracted by the stepper motor 266 to maximum or minimum extension, until the motor 266 stalls. At this position, the encoder will send no more pulses to the controller since the target disk stops rotating. This sets the maximum extension or maximum retraction. The stepper motor 266 can then be reversed and selectively driven a pre-selected amount to properly position the rod end portion 274.

Figure 5:
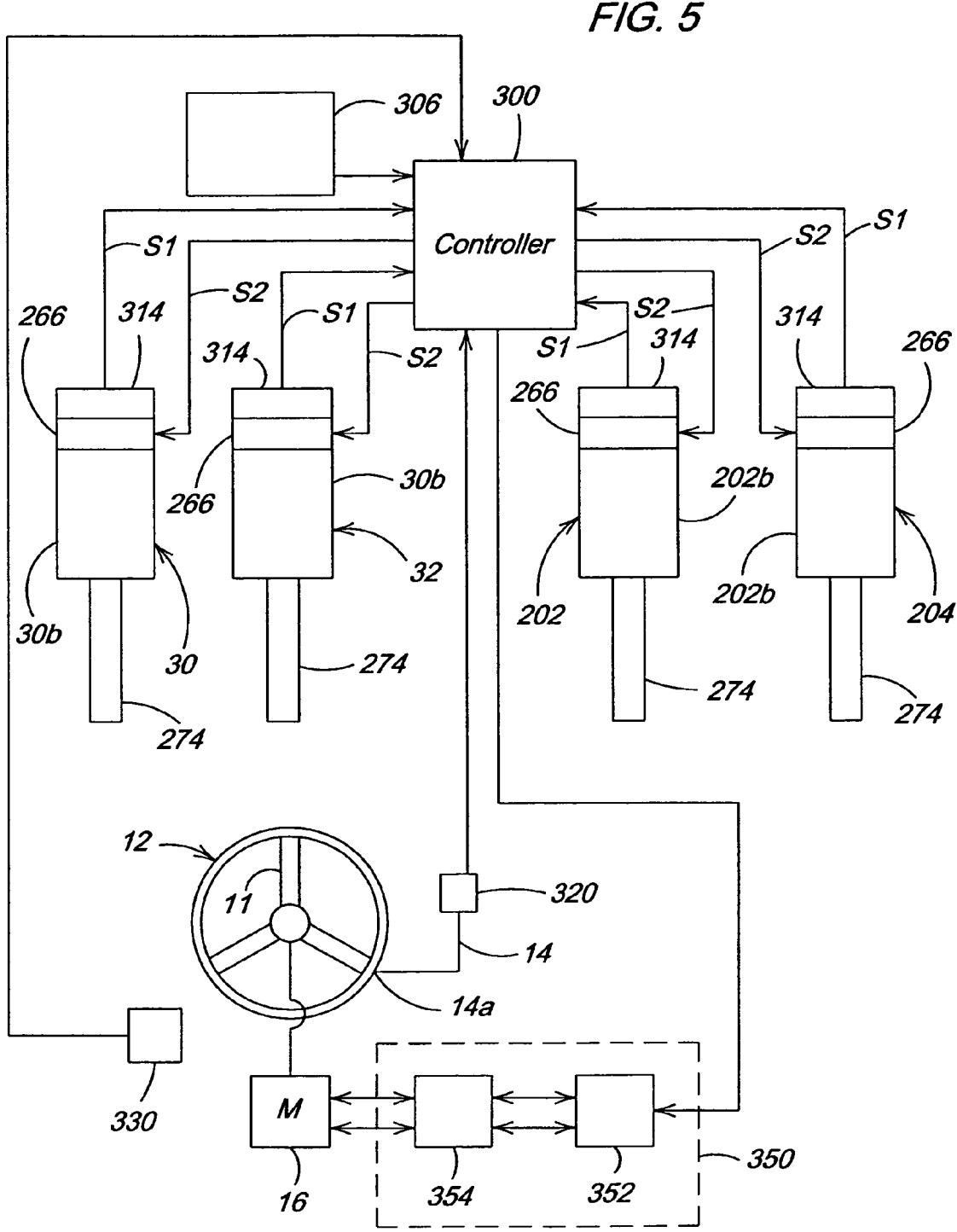
FIG. 5 is a schematic diagram of a control system of the present invention.

FIG. 5 illustrates a controller 300, such as a microprocessor, used to control the actuators 30, 32, 202, 204. The controller can be a MOTOROLA POWER PC MPC555 signal-connected to power electronics for each actuator, such as to plural IMS IB462H units. An operator input station or operator interface 306 is provided for giving instructions to the controller 300. The operator interface is "signal-connected" to the controller, i.e., is in signal communication with the controller. The signal connection can be by wire or can be wire-less, such as by radio signal or infrared. The signal connection is preferably by serial link. The input station can be configured as described below, associated with FIGS. 8-21.

The cutting reel unit control system can also be automatically self-adjusting, which periodically corrects the reel adjustments such as the reel speed, the height-of-cut, the reel lateral leveling, and the reel-to-bedknife clearance, or corrects the reel-to-bedknife clearance if contact between the reel and bedknife is sensed by the detector 320 during operation.

The cutting reel unit control system can be configured as a central controller or by controllers located at each cutting unit, or even by a local controller designated for each actuator. The controller or controllers are responsive to the operator input station 306. The cutting reel unit control system can be adjusted after operator initiation or automatic initiation of an adjustment routine in a central controller or by operator initiation or automatic initiation of control routines performed by controllers at each cutting unit or at each actuator.

The cutting reel unit adjustment can be made by an operator input station or interface 306 that can be on board the vehicle moving the cutting reel unit, or can be external to the cutting reel unit, such as by an operator input station that is used in a shop to re-adjust or re-task a cutting unit for a pre-selected grass condition or area and desired height-of-cut. The controller 300 can also be external to the cutting unit for shop adjustment of the cutting reel unit.

The cutting reel adjustment can also be initiated by the controller responsive to an external sensor such as a height of grass sensor, or responsive to a location sensor and/or sender on the cutting unit or cutting machine that communicates with an external ground-based system or a global positioning system (GPS). These systems, responsive to external conditions, along with the onboard control systems as described herein facilitate implementation of the control system in either a manned cutting machine or an autonomous cutting machine.

For example, different areas of a golf course could be mapped electronically and preprogrammed into the onboard or remote controller and such controller could communicate with the external positioning system and thereafter adjust the actuators to adjust the cutting unit for the type of grass, the area, and desired cut lines for corresponding areas of the golf course.

The operator, via the input station 306, or the controller responsive to an automatic routine, can command the reel rotating speed and direction of rotation to the reel motor 16. A reel speed sensor 330 can be associated with the reel 12 or with the reel motor 16, or with other associated rotating element to communicate reel speed to the controller 300. The speed sensor 330 can be a known type that senses speed by magnetic or optical targets that rotate with the reel, motor or other rotating element that are sensed by a stationary sensor. The controller can be signal-connected to a system 350 that controls the speed and direction of rotation of the reel motor 16 to adjust the speed and direction of rotation of the reel 12. When a hydraulic motor is used, the system 350 can include speed and direction of rotation control of a hydraulic pump 352 that drives the hydraulic motor and/or flow control of valving 354 that diverts hydraulic fluid away from the motor 16 to adjust speed and/or reverses hydraulic fluid flow to change direction of rotation of the motor 16. The controller 300 can adjust the speed of the reel 12 based on grass length or type of grass given operator or other input.

The speed information from the speed sensor 330 can be operator-accessible by the interface 306 and adjusted by operator selection of a choice of pre-selected speeds or by manual adjustment.

The operator, via the input station 306, or the controller responsive to an automatic routine, can command adjustment of the height-of-cut, say in mm, and can command the automatic adjustment of the reel-to-bedknife clearance. For adjusting the reel-to-bedknife gap as explained below, by operator or automatic initiation the controller can command the reel motor 16, such as via the system 350, to spin the reel 12 in a reverse direction before initiation of the adjustment procedure by the operator. The actuator pairs 30, 32; 202, 204 can be adjusted individually to set a desired lateral degree of either the height-of-cut level or the reel-to-bedknife clearance. A position signal S1 from each actuator read head 314 is communicated to the controller 300, and an appropriate drive signal S2 is sent to the stepper motor 266 of each actuator via appropriate signal conditioning and/or amplification to position rod end portions 274 with respect to the respective actuator body 30b, 202b of the actuators 30, 32, 202, 204.

The detector 320 (FIG. 2) can be used to detect contact between the reel and bedknife during operation to cause an alarm or to otherwise note or record the occurrence and/or can be used to adjust the reel-to-bedknife clearance. The detector 320 can be of a variety of types, including an accelerometer or a sound detector. The detector 320 can be a sound detector such as a microphone, such as an EMKAY MR-3151 from Emkay Innovative Products of Itasca, Ill., U.S.A. The microphone can be potted in polyurethane for protection and to strain relieve associated signal wires. The detector 320 can be provided in close proximity to the bedknife 14. The detector 320, in the form of a microphone, may be embedded in the bedknife, or mounted near the bedknife so as to detect the contact of the reel to the bedknife during the adjustment methods.

According to an exemplary embodiment, the detector or detectors 320, such as in the form of a microphone or microphones, can be located within the casing 297 of the motor drive 202a of one or both of the actuators 202, 204 (see FIG. 4). Particularly, each microphone can be secured, such as by adhesive, to the circuit board 315 located within the casing. The microphone circuitry and wiring can be integrated into the circuit board and the signal-connecting wiring can share the same conduit as the encoder wiring. By locating the microphone(s) within the actuator(s) the protected environment within the casing(s) 297 can be utilized to protect the microphone(s). This represents an operational and a manufacturing cost savings advantage. Since sound and vibrations travel through the structure of the reel unit, it is not absolutely necessary to mount the sensor(s) 320 in the immediate vicinity of the bedknife. It is also encompassed by the invention to mount the sensor(s) 320 within the actuators 30, 32

The detector 320 is signal-connected to the controller 300. Advantageously, during an adjustment procedure, the reel 12 is spun backwards and the detector 320 detects and signals to the controller any contact or "clicking" between the reel blades of the rotating reel 12 and the bedknife 14. Preferably, two detectors 320, 320 are provided, one at each end wall 14b of the bedknife, although a single detector 320 could be used as well, located at a position where sound can be detected from contact of the reel blades at either end of the bedknife.

According to one method, wherein the noise produced by the reel is sensed by a microphone, or alternately by an accelerometer, the resulting vibration is analyzed to detect the presence or absence of contact.

The algorithm used to analyze the noise is designed to detect a particularly prominent resonance point in the sensed sound when the reel and bedknife are clicking. The resonance is detected by using a single frequency range power spectral density (psd) estimate of the signal power. The single range method calculates the psd at only a single narrow frequency range (or bin) of interest. Reducing the psd algorithm in this way significantly lessens the computational effort needed versus the full psd. This style of algorithm is used to reduce sensitivity to spurious environmental noise. The resonance can also be detected in using an analog or discrete switched capacitor narrow bandpass (or notch) filter, rectifying the filter output, and then detecting the DC level of the resulting signal.

Alternately, a simple algorithm that senses the increased noise level when the reel and bedknife are in contact can be used, but this algorithm can be sensitive to environmental noise.

Figure 6:
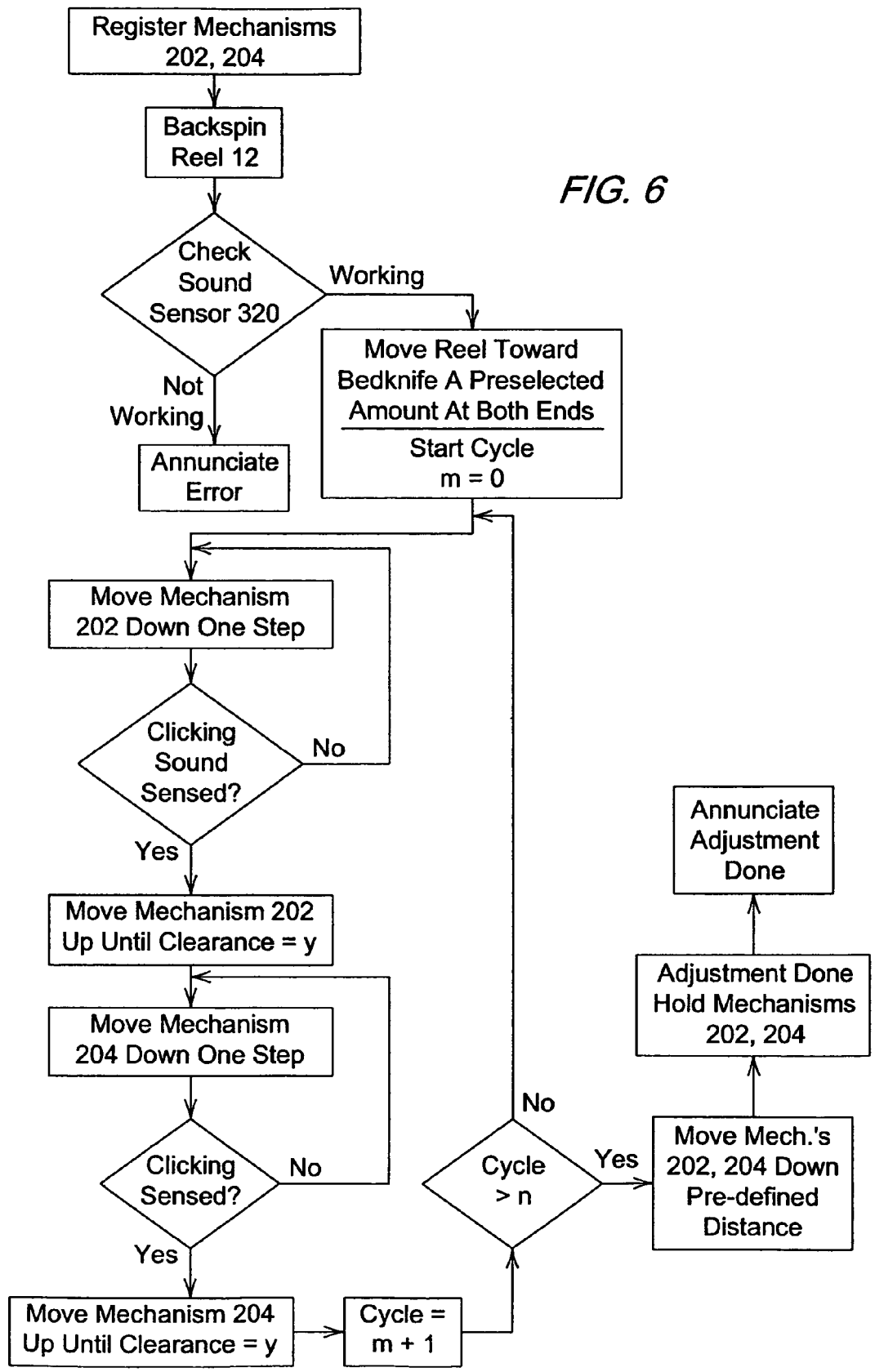
FIG. 6 is a schematic block diagram illustrating a method according to the present invention.

A method of precisely positioning the reel 12 with respect to the bedknife 14 using the sound detector(s) 320 is set forth in FIG. 6. The methods of the invention can all be automatically accomplished at the direction of the controller after initiation by an operator. Although the method as set forth below is described as being operator initiated, the method can also be initiated automatically during operation, initiated periodically by the controller or initiated by the sensing of reel-to-bedknife contact during operation, or initiated by a change in reel tasking, i.e., a new type of grass or length of grass to be cut. This change in reel tasking can be initiated by a remote signal or a sensed signal such as by a grass height sensor, or a ground-based or GPS based position signal.

Figure 9:
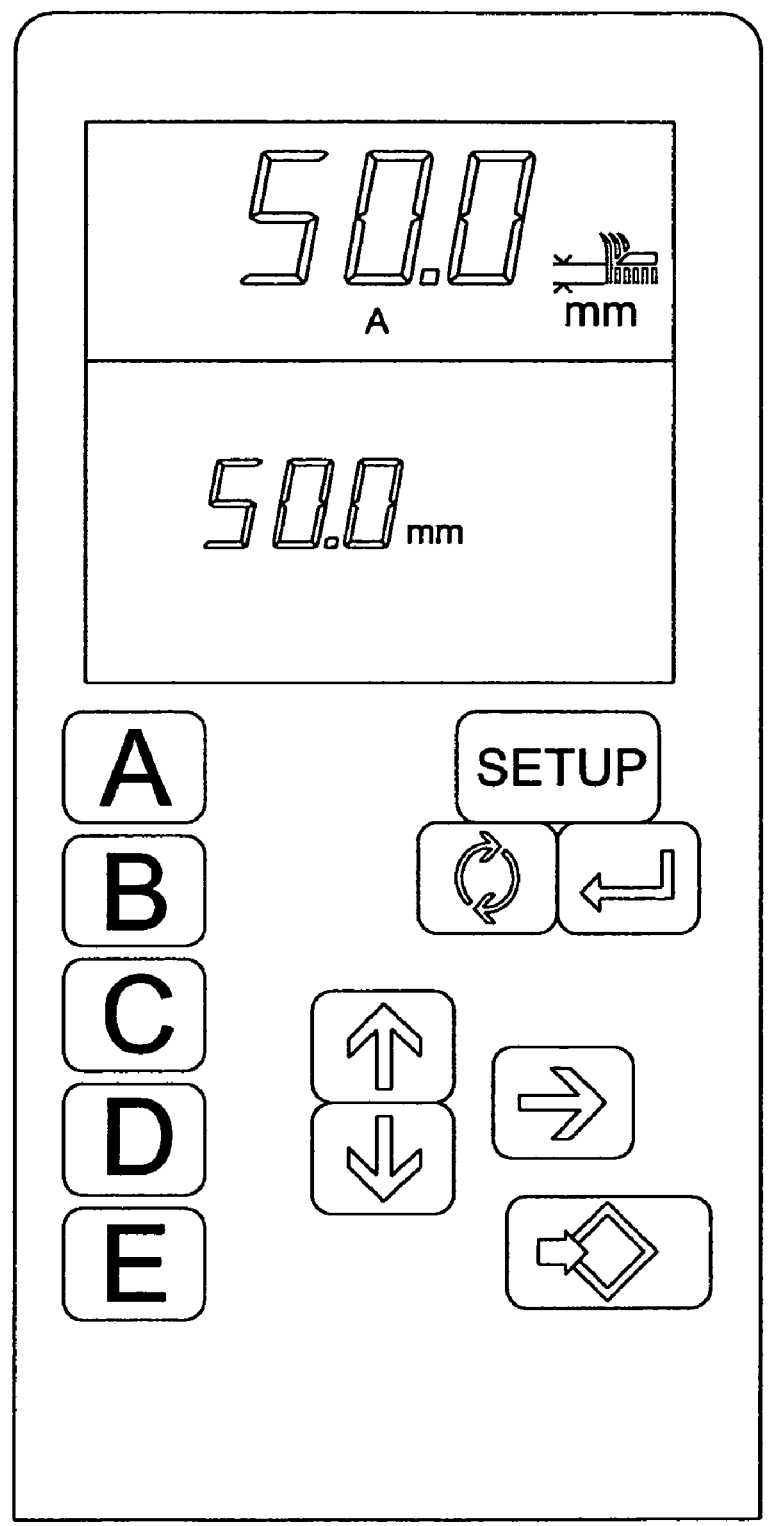
FIG. 9 is a schematic plan view of the operator input station of FIG. 8 in a height-of-cut adjusting screen.

The steps of one method of the invention comprise:

1. registering adjustment mechanisms 202, 204 by moving the reel adjustment mechanisms 202, 204 to known positions, particularly, moving the rods 202c to known positions with respect to the bodies 202b using the drive motors 202a;

2. spinning the reel 12 in a reverse direction from the normal operating direction, normal operating direction being a counterclockwise direction as viewed in the right side view of FIG. 9, that is, during normal operation the bottom of the reel 12 spins toward the bedknife;

3. moving the reel 12 toward the bedknife 14 an equal pre-selected distance on both ends of the reel, particularly by using the drive motors 202a to move the rods 202c an equal pre-selected amount with respect to the bodies 202b;

4. moving the reel 12 toward the bedknife 14 on a first end of the reel by a continuous step or by incremental steps of the drive motor 202a of the actuator 202 until a contact between the reel and the bedknife is detected by the adjacent detector 320, particularly by using the drive motor 202a of the actuator 202 to extend the rod 202c with respect to the body 202b; the contact can be detected as a faint clicking sound detected by the detector 320 being in the form of a microphone;

5. moving the reel 12 on the first end of the reel away from the bedknife 14 to produce a clearance of a small pre-defined distance "y", where y>desired gap width, particularly by using the drive motor 202a of the actuator 202 to retract the rod 202c with respect to the body 202b;

6. moving the reel 12 toward the bedknife 14 on an opposite end of the reel by a continuous step or by incremental steps of the drive motor 202a of the actuator 204 until a contact between the reel and the bedknife, a faint clicking, is detected by the adjacent sound detector 320, particularly by using the drive motor 202a of the actuator 204 to extend the rod 202c with respect to the body 202b; the contact can be detected as a faint clicking sound detected by the detector 320 being in the form of a microphone;

7. moving the reel 12 on the opposite end of the reel away from the bedknife 14 to produce a clearance of the small pre-defined distance y, particularly by using the drive motor 202a of the actuator 204 to retract the rod 202c with respect to the body 202b; and 8. repeating the adjustment of steps 4 through 7 "n" times wherein "n" is experimentally pre-determined to be the minimum number of cycles that produces the accurate pre-defined distance y on both ends of the reel. Currently, it is anticipated that only a few cycles of steps 4 through 7, such as n=3, will be needed to produce an accurate pre-defined distance y on both ends of the reel. Alternately, the precise locations of the first reel end with respect to the bedknife, at positions before step 4 and after step 5, and the precise locations of the respective second reel end with respect to the bedknife, at positions before step 6 and after step 7, can be stored and compared until a consistent distance y between the reel and the bedknife is achieved at each reel end. The precise locations are provided by the encoders 310 of the actuators 202, 204 and sent to the controller.

9. after the accurate distance y is set at both ends of the reel, moving both ends of the reel toward the bedknife by the difference between the pre-defined distance y and the pre-selected gap width, (y minus gap width) to set the pre-selected gap width between the reel and the bedknife. By first accurately setting the pre-selected reel-to-bedknife clearance y as a penultimate setting, and then subsequently reducing this clearance to the smaller gap width, the detection accuracy of the method is enhanced because contact between the reel and bedknife during the click detection cycle is more likely to be limited to contact at the extreme ends of the reel. The resulting gap width between the reel and the bedknife can be in the range of, but not limited to, about 0.001 to 0.003 inches.

Other methods encompassed by the invention are possible. Method step 1 above can be eliminated. Method step 2 can be eliminated, or can be modified wherein the reel 12 is spun in the normal operating direction. Method step 3 can be modified wherein the reel 12 is moved away from the bedknife 14 a pre-selected distance on both ends of the reel. Method steps 5 and 7 can be modified wherein the small pre-defined distance y can be equal to the actual gap width and method step 9 can then be eliminated.

Furthermore, although the steps refer to moving the reel toward or away from the bedknife, this is to be interpreted as relative movement, such relative movement would also encompass moving the reel toward or away from a stationary bedknife, moving the bedknife toward or away from a stationary reel, or moving both reel and bedknife toward and away from each other.

Figure 7:
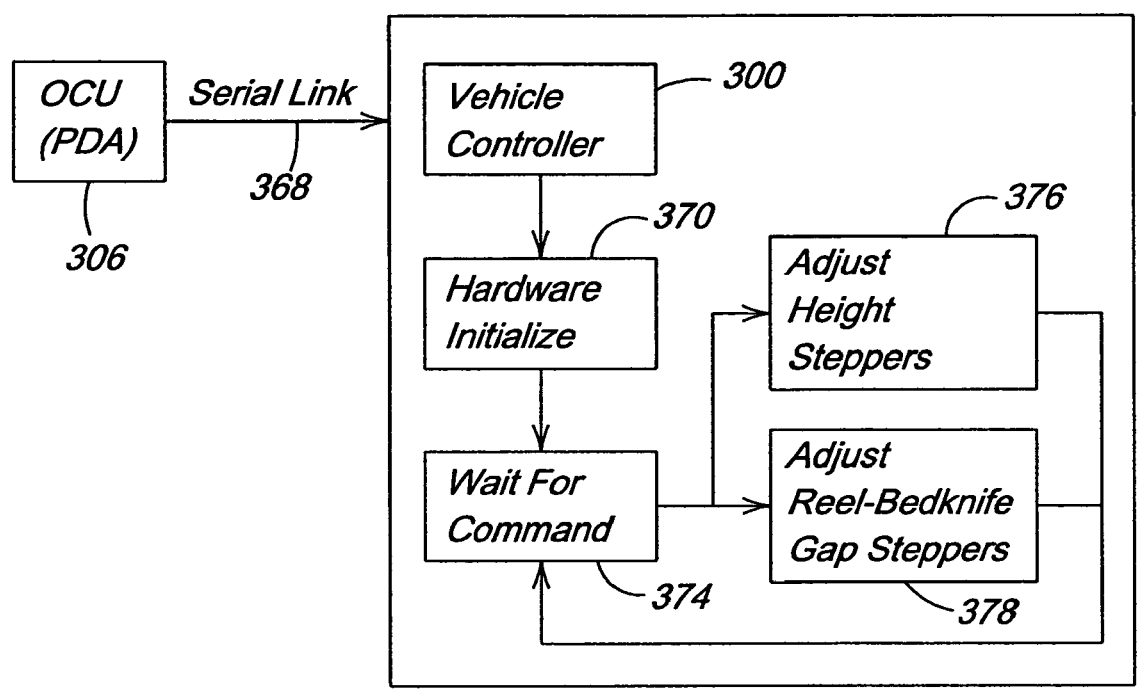
FIG. 7 is a schematic block diagram of control system architecture of the present invention.

FIG. 7 illustrates a generalized control scheme for the operator interface 306 and the reel adjustments. The operator interface 306 is signal connected to the vehicle controller 300, preferably via a serial link 368. The vehicle controller 300 is signal-connected to the reel hardware, specifically the actuators 30, 32, 202, 204. The actuators 30, 32, 202, 204 can then be initialized, step 370, such as registered by being selected, or by being moved to a home position or stall position or calibrated if such routines are selected. Once initialized, the system waits, step 374, for an adjustment command such as an automatic adjustment or a manual adjustment selection. A height-of-cut adjustment 376 or a reel-to-bedknife adjustment 378 can then be undertaken. The method of FIG. 7 is further explained and refined in the following description and FIGS. 8-21.

Figure 8:
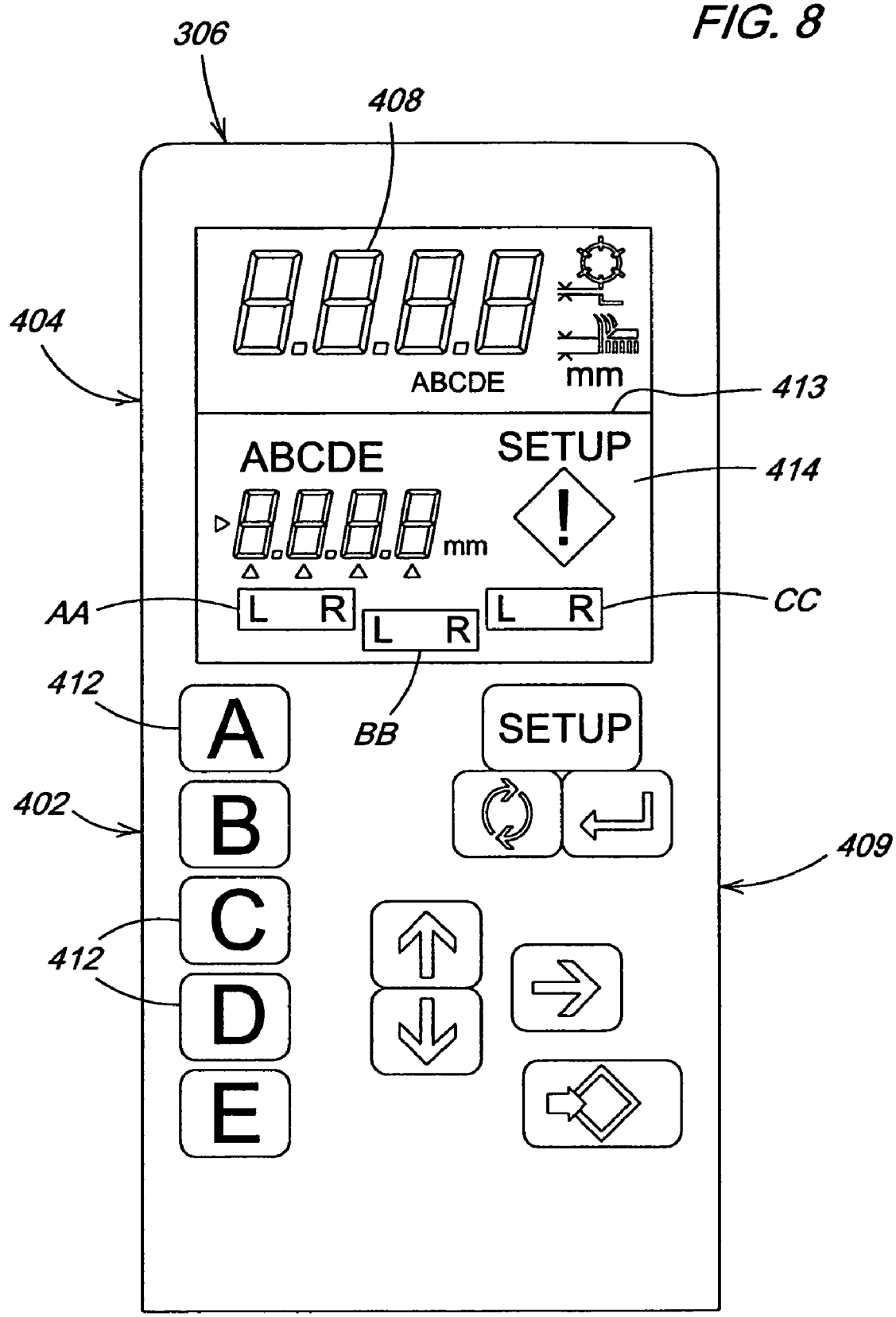
FIG. 8 is a schematic plan view of an operator input station according to the invention.

FIG. 8 illustrates one embodiment of an operator input station or user interface 306 for the cutting reel system. The interface 306 can be used to adjust plural reels such as reel units AA, BB and CC. It is typical that a mowing vehicle would pull or push three reel units. FIG. 8 illustrates a start or home screen. This user interface includes an input portion 402 and a display portion 404. The display portion 404 can include plural LCD segments 408. The input portion 402 can include a keypad 409 having 12 membrane switches 412 including five cut heights A, B, C, D, or E, setup, next, exit, three arrow buttons, two for up and down to change value and another for advancing digit position, and enter. The display portion 404 also includes boxes around the left and right indicator. A horizontal line 413 is indicated on the LCD glass 414. Above the line is displayed the actual cut heights and labels A, B, C, D, or E with an appropriate icon. Below the line is displayed the target value for the various cut heights, setup information for setting the reel-to-bedknife gap and an alert icon. The interface 306 is advantageously simple and self explanatory for enhanced user understanding and operation.

FIG. 9 illustrates a screen that results after the cut of height button A is pushed from the home screen, Figure B. The cut heights target is shown in small characters below the horizontal line. For this example the cut height "A" in this example is 50 mm.

Figure 10:
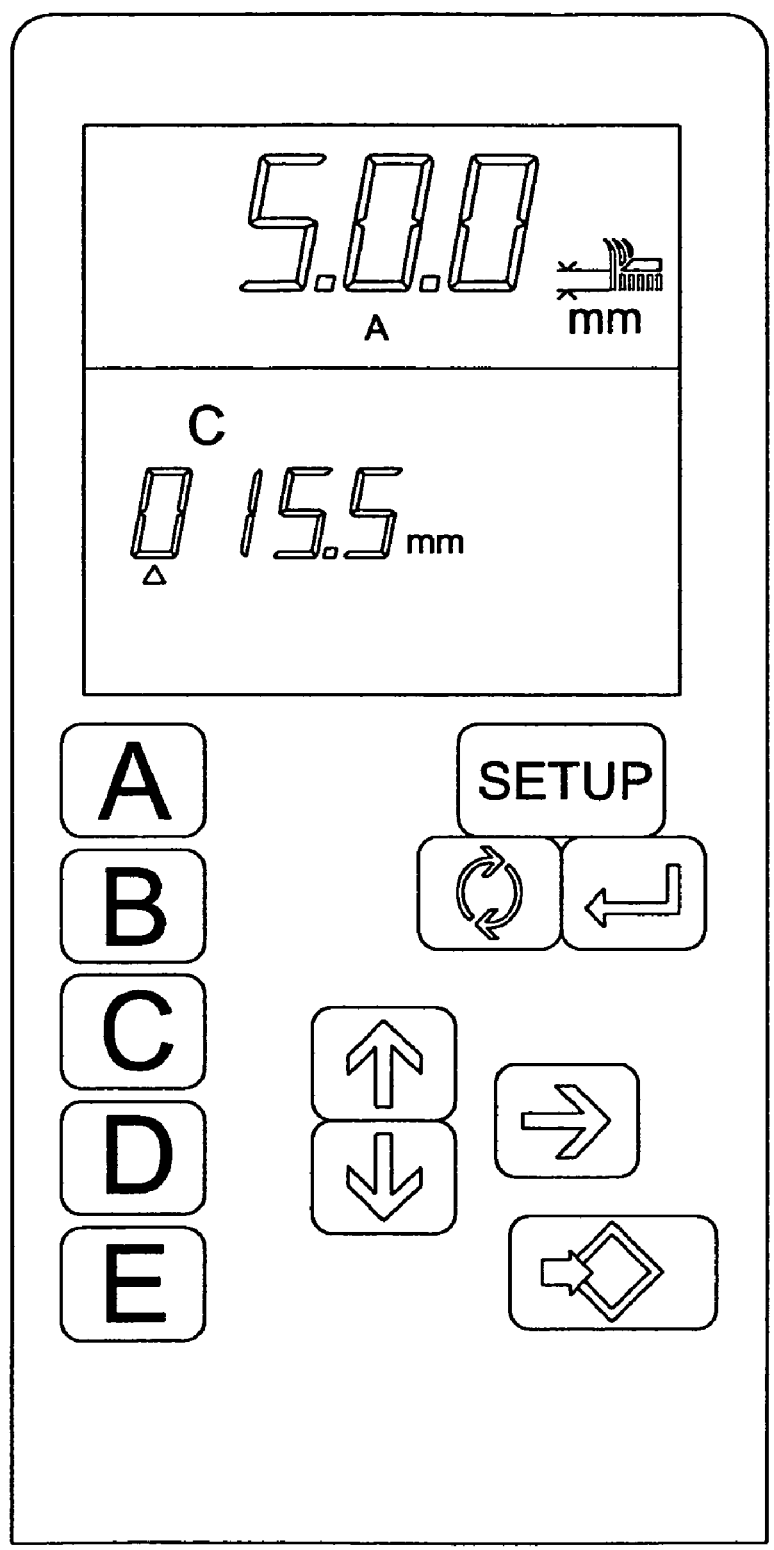
FIG. 10 is a schematic plan view of the operator input station of FIG. 9 in the height-of-cut adjusting screen.

FIG. 10 illustrates the screen that results after a new cut height "C" is selected. In this example the cut height "C" has been preset at 15.5 mm. Arrows can be used to enter new heights if desired, the horizontal arrow for digit, and the up/down arrows for value change. The triangle indicates which digit is being changed by the up/down arrows. Other letters can be pressed to change other stored values. Once the value is selected, the enter button is activated to change the setting. The large display will show the current value change from, for example, 50 to 15.5 and the indicator A will change to the indicator C. If the value for C, in this example 15.5, cannot be achieved, a warning icon appears and the large display flashes. After 30 seconds, the small number remains but the C next to the small number and the triangle disappear to prevent inadvertent changes to the settings. Pressing a letter allows the value to be changed again.

Figure 11:
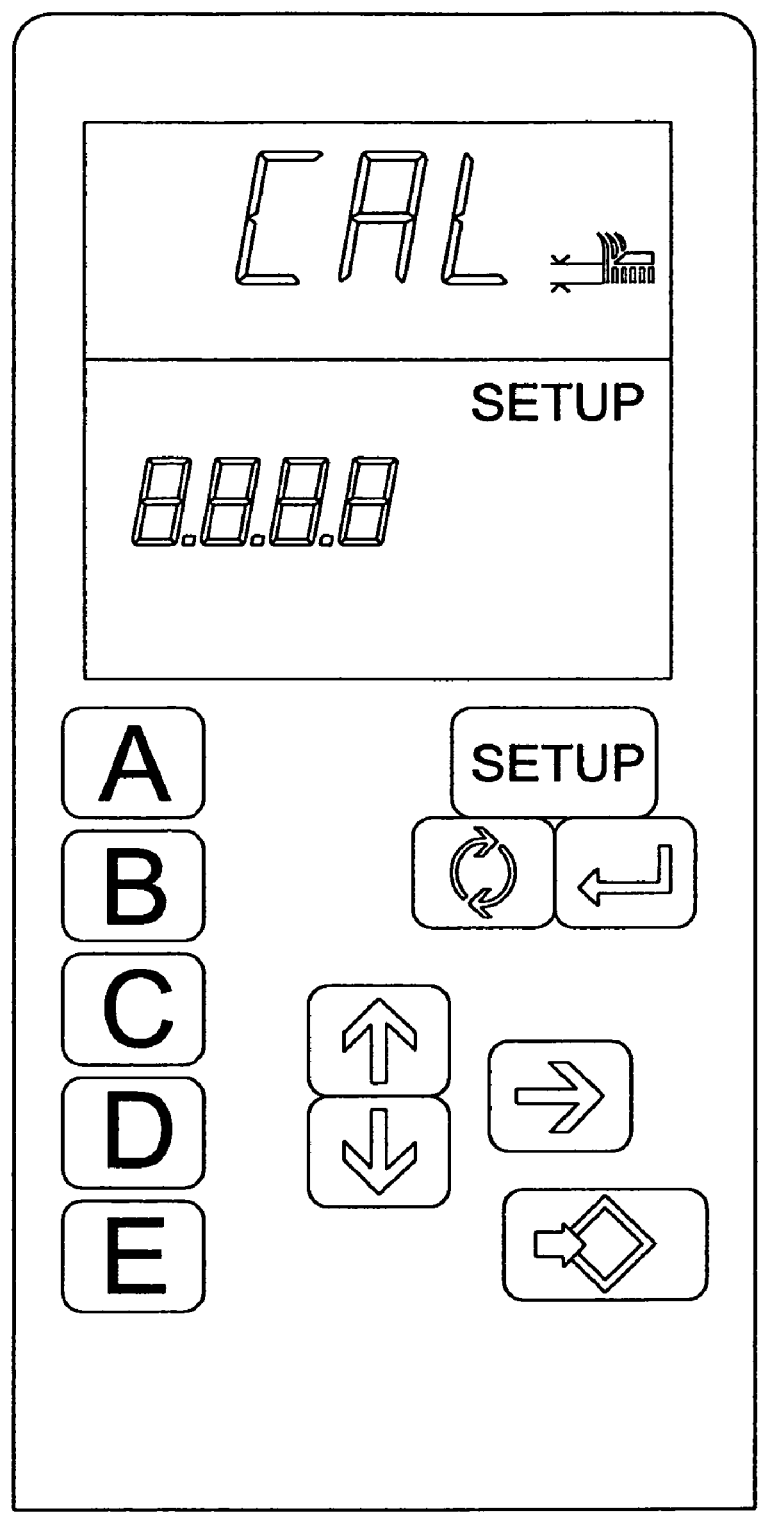
FIG. 11 is a schematic plan view of the operator input station of FIG. 8 in a height-of-cut calibration screen.

FIG. 11 illustrates the setup page for recalibrating the cut heights. First, the setup button is pressed. Calibration should be as automatic as possible with minimal user input. The display shows "CAL". The calibration begins when the user presses enter. Pressing the "next" button advances to the next selection and a list of possible setup transactions such as:

"calibrate cut height", to calibrate a cut height with a position of the actuators 30, 32 for any reel;

"reel AA auto gap", to run the reel-to-bedknife gap setting procedure for reel AA;

"reel BB auto gap", to run the reel-to-bedknife gap setting procedure for reel BB;

"reel CC auto gap", to run the reel-to-bedknife gap setting procedure for reel CC;

"reel AA left manual", to manually adjust either the reel-to bedknife gap or height-of-cut at the left side of reel AA;

"reel AA right manual", to manually adjust either the reel-to bedknife gap or height-of-cut at the right side of reel AA;

"reel BB left manual", to manually adjust either the reel-to bedknife gap or height-of-cut at the left side of reel BB;

"reel BB right manual", to manually adjust either the reel-to bedknife gap or height-of-cut at the right side of reel BB;

"reel CC left manual", to manually adjust either the reel-to bedknife gap or height-of-cut at the left side of reel CC;

"reel CC right manual", to manually adjust either the reel-to bedknife gap or height-of-cut at the right side of reel CC.

Pressing the exit button exits the setup mode and returns to the operating page.

Figure 12:
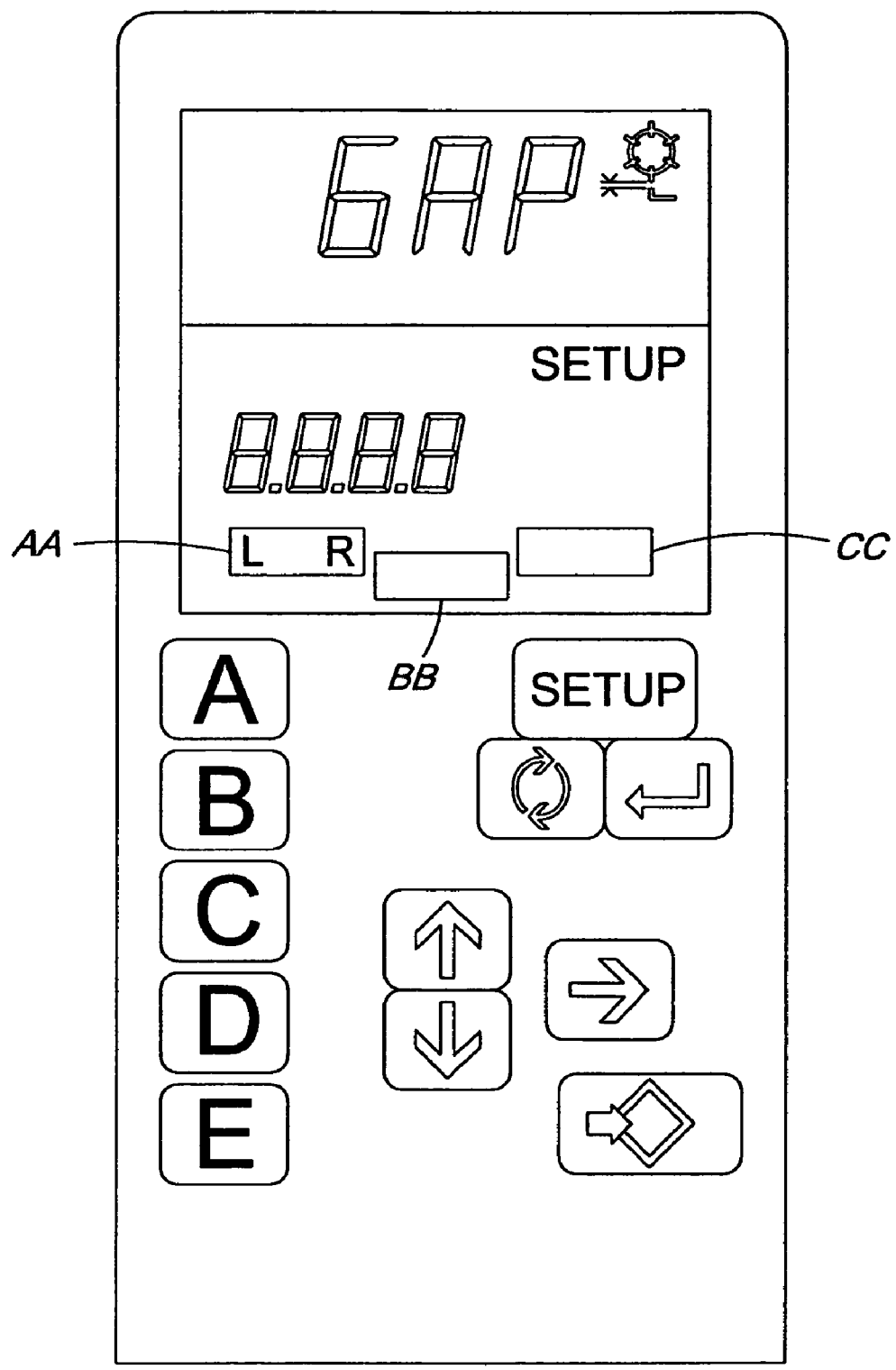
FIG. 12 is a schematic plan view of the operator input station of FIG. 8 in an auto-adjust operating screen for reel-to-bedknife gap adjustment.

FIG. 12 illustrates the auto adjust for the bedknife gap for the left reel, reel AA. To reach this page from the previous page the "next" button is pressed. The enter button is pressed to start the auto adjust, the small numbers could be used for status or feedback if needed. The "next" button is pressed to adjust the middle reel, reel BB and the process is repeated. The large letters indicate "GAP" to show that the bedknife gap is being adjusted.

Figure 13:
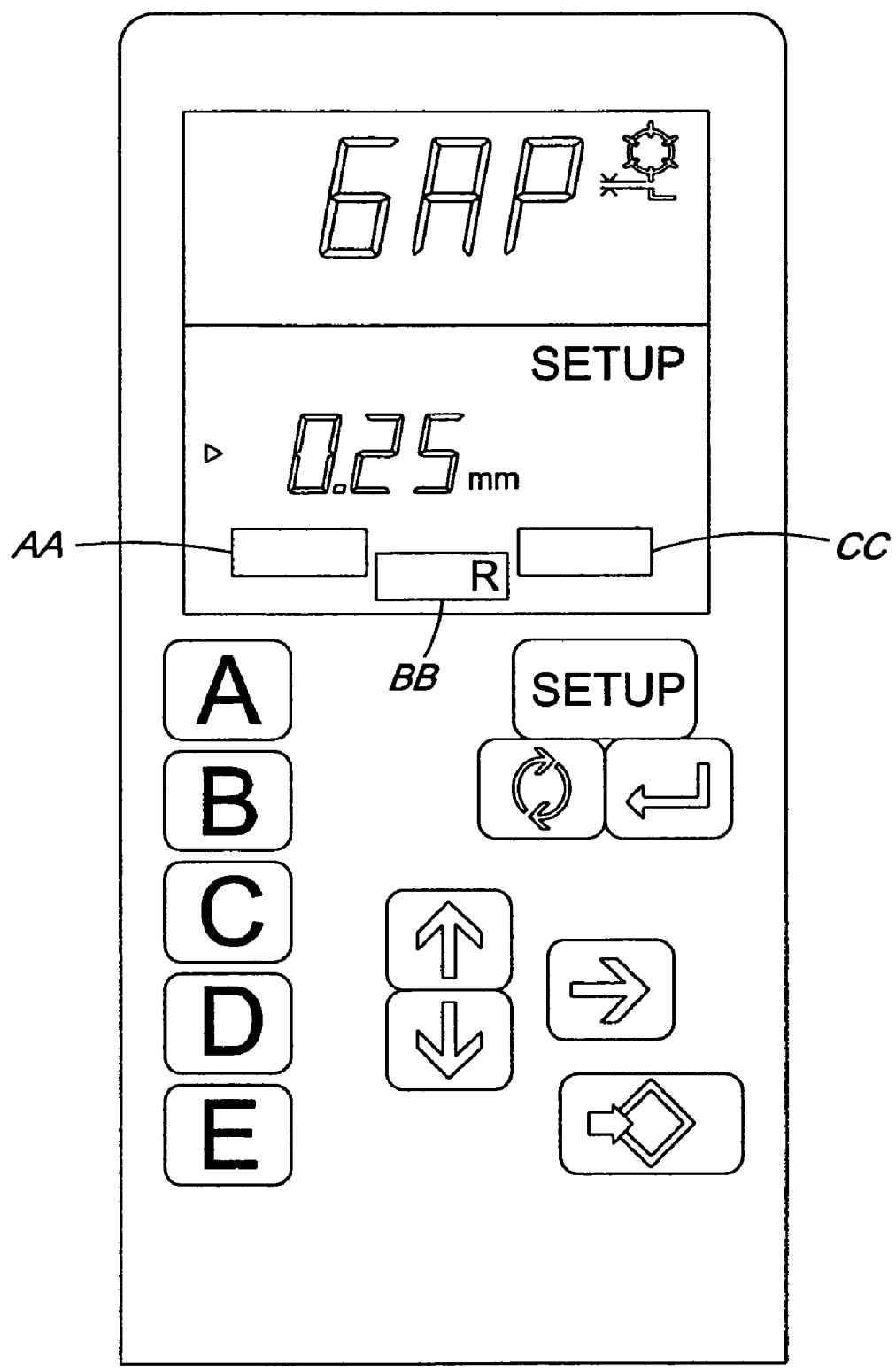
FIG. 13 is a schematic plan view of the operator input station of FIG. 12 in a fine adjust operating screen for reel-to-bedknife gap adjustment.

FIG. 13 illustrates a further adjustment on the gap screen. From the previous page the "next" button is pressed. The "next" button is pressed until the desired reel actuator is selected, L or R. The triangle indicates the complete number is being changed. The up and down arrows are pressed to change the value. Once the value is correct, the enter button is pressed to activate. The "next" button is pressed for more calibration transactions or the exit button is pressed to return to the operating page.

Figure 14:
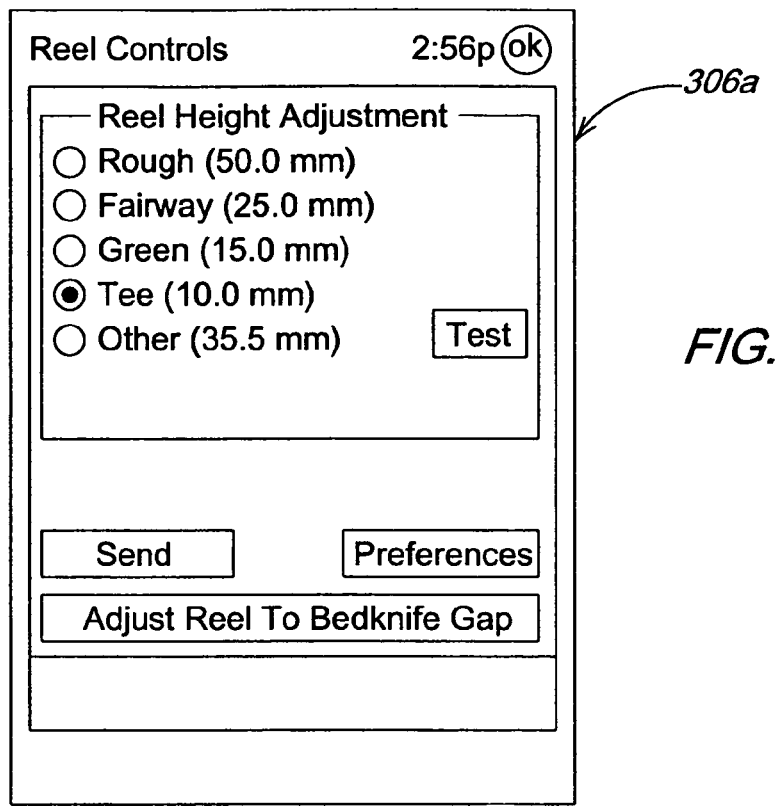
FIG. 14 is a plan view of an alternate user interface according to the invention, showing a reel height adjustment screen.

FIG. 14 illustrates an alternate embodiment of the operator input station 306a. In this embodiment a commercially available personal digital assistant (PDA) 306a such as a CASIO INDUSTRIAL VERSION PDA, or an EG800. FIG. 14 illustrates a height-of-cut window on the PDA 306a.

The height-of-cut function is controlled by the following buttons and process:
(5) preset heights, with the ability to change the presets,
(1) "do it now" or "send" button to initiate a height change,
(1) preferences button,
(1) calibrate button,
(1) register button,
(1) reset button to return to default value preferences,
(1) adjust reel-to-bedknife ("R2B") clearance button to skip to the reel-to-bedknife adjustment routing (FIGS. 16-21).

Figure 15:
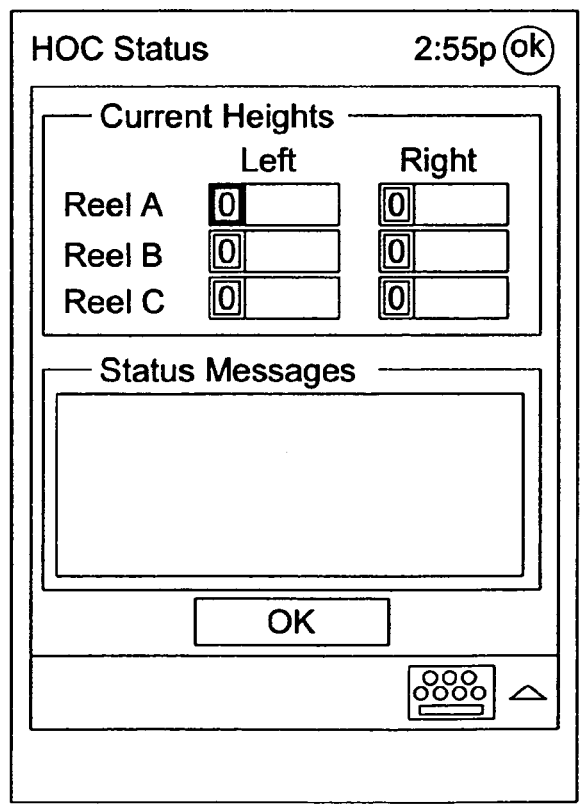
FIG. 15 is a plan view of the alternate user interface, showing a height-of-cut status screen.
Figure 16:
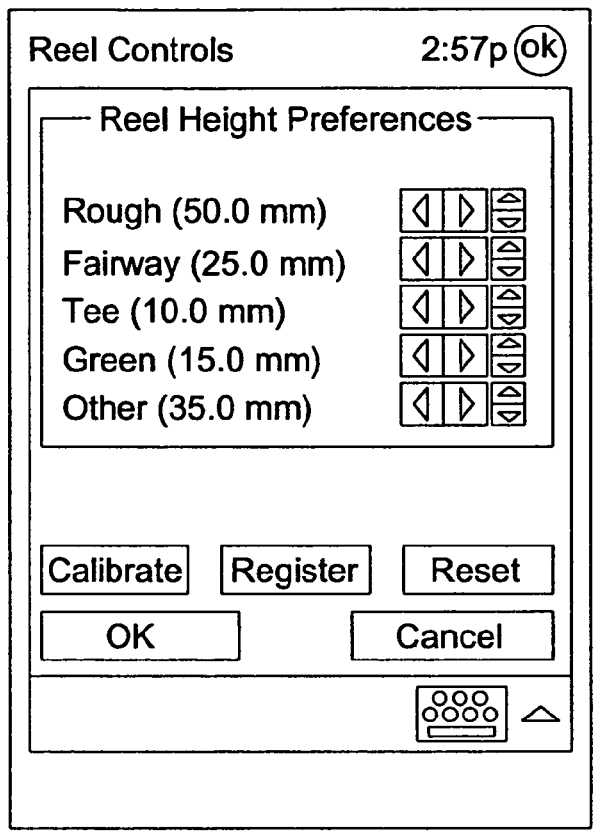
FIG. 16 is a plan view of the alternate user interface, showing a height-of-cut reel control screen.

FIGS. 15 and 16 illustrate screens responsive to the send and preference buttons respectively from the reel controls screen (FIG. 14). FIG. 15 illustrates the completed adjustment status after the send button is actuated to adjust the reels.

The reel height preferences can be changed using the FIG. 16 screen by using the arrow buttons followed by the ok button. The reset button can be used to return all reel height values to default values. The register button drive the stepper motor until they stall against their respective stops to register the home position of the respective encoders.

Figure 17:
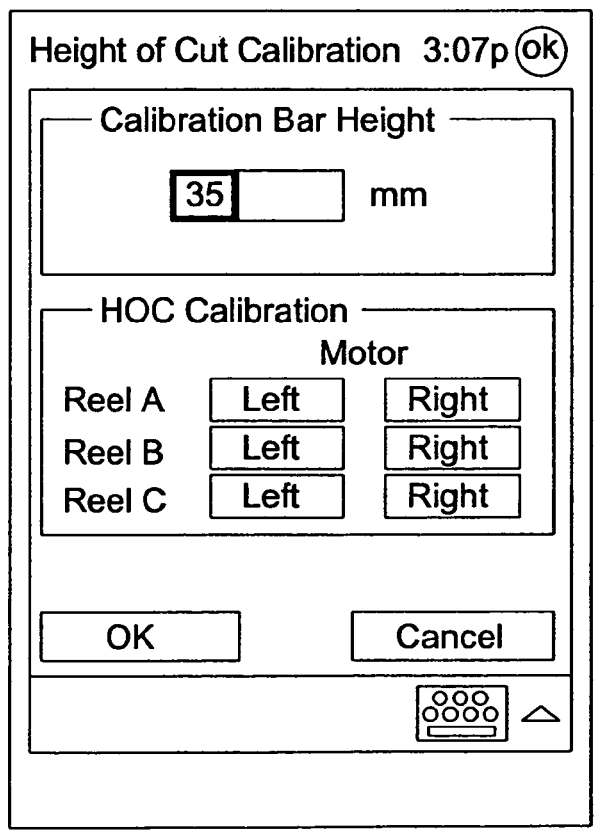
FIG. 17 is a plan view of the alternate user interface, showing a height-of-cut calibration screen.

FIG. 17 illustrates the height-of-cut calibration screen. FIG. 17 is accessed by pressing calibrate on the preferences screen (FIG. 16). The calibrate button for height-of-cut instigates the following steps:
   Register the stepper motors by stalling the stepper motors against their respective stops (all the way retracted).
   Enter the height of the calibration bar (unless this never changes).
   Stall the stepper motors against the calibration bar and read the encoder counts.
   Calculate the new offset for the curve fit that translates number of encoder counts to height-of-cut (and the other way around).
   Store the value of the offset for each stepper motor to non-volatile memory (or use a battery backup system to keep memory powered).

Another method of calibrating the height-of-cut includes the steps of:
   using the register button to register the actuators 30, 32 to determine position relative to end of travel, either extended or retracted;
   with the system operating but not actively adjusting, setting the height-of-cut manually using a wrench to turn the respective actuators 30, 32;
   pressing the calibrate button on the interface 306 for the actuator being adjusted, which sends a calibrate message to the interface, which responds with the actuator positions in steps from the end of travel.

Figure 18:
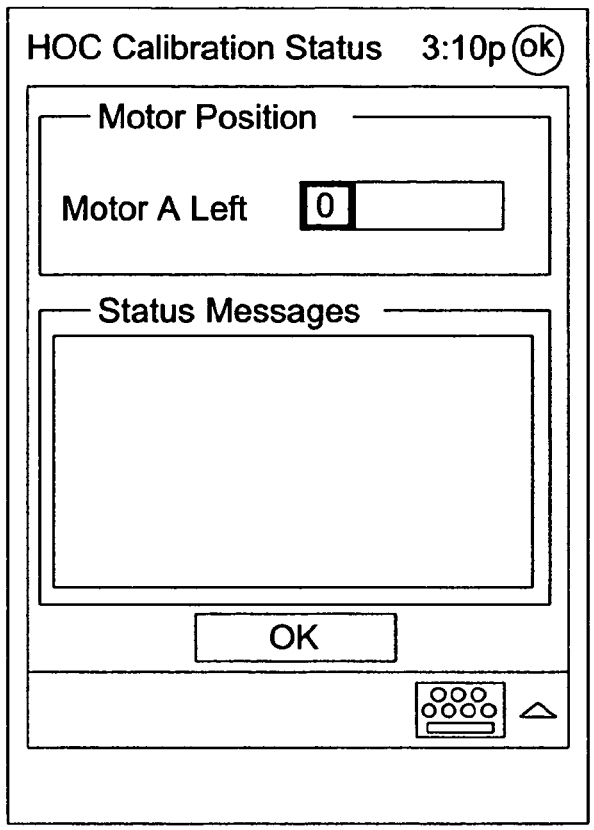
FIG. 18 is a plan view of the alternate user interface, showing a height-of-cut calibration status screen.

FIG. 18 illustrates the status of calibration for each reel motor. Pressing the OK button returns to the calibration screen, FIG. 17, for the next motor to be calibrated.

Figure 19:
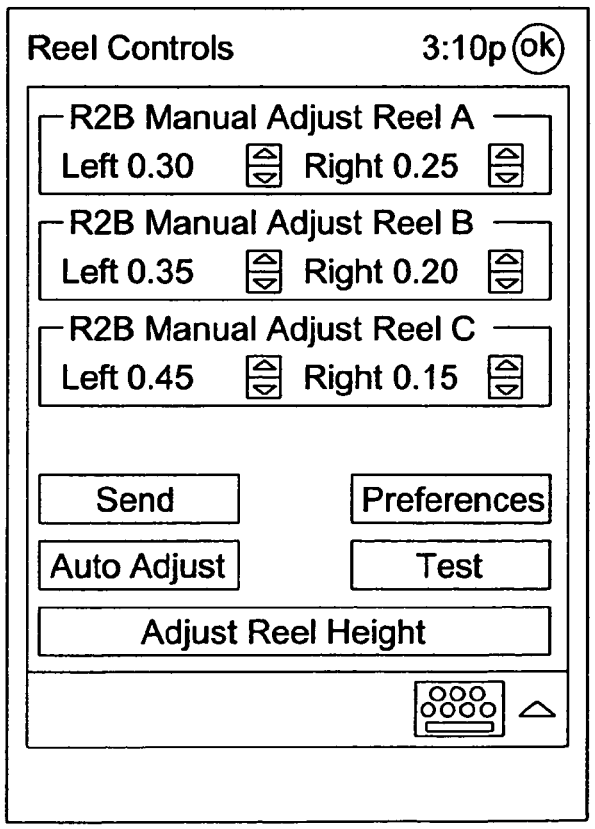
FIG. 19 is a plan view of the alternate user interface, showing a reel-to-bedknife control screen.
Figure 20:
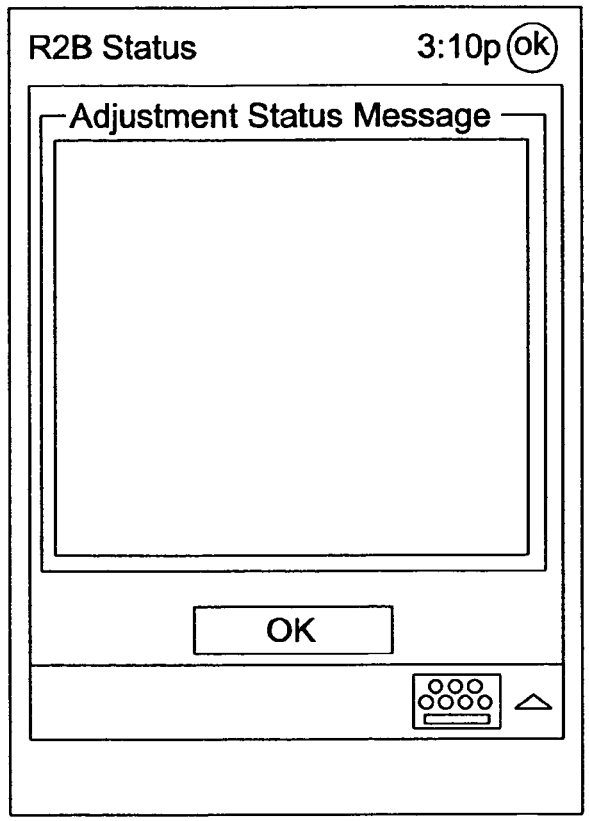
FIG. 20 is a plan view of the alternate user interface, showing a reel-to-bedknife adjustment status screen.
Figure 21:
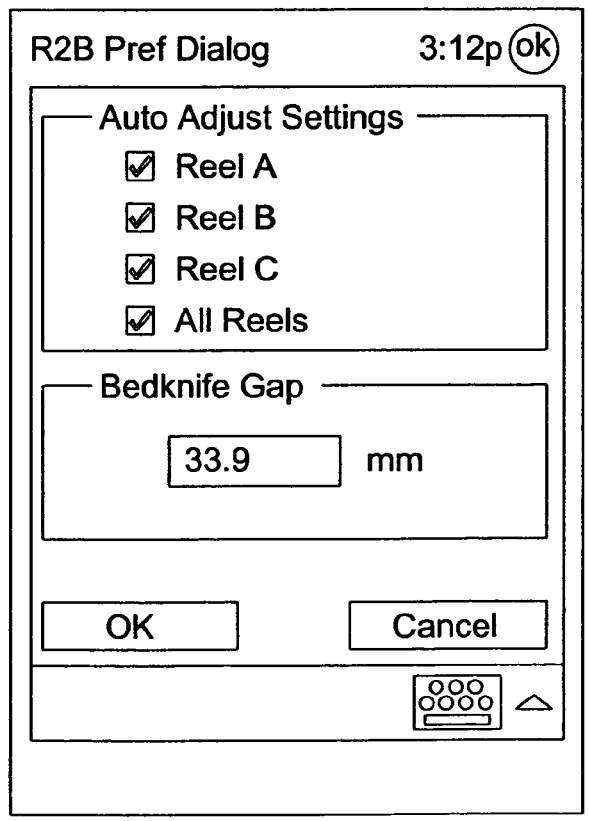
FIG. 21 is a plan view of the alternate user interface, showing a reel-to-bedknife adjustment preference screen.

FIGS. 19-21 show the screens used for reel-to-bedknife ("R2B") adjustment. The reel-to-bedknife adjustment function is accomplished using the following buttons and screens:
   button for selecting which reel to adjust and, buttons for "fine" adjustments for both left and right stepper motors;
   "do it now" or "send" button to initiate the adjustment;
   preference button;
   an auto-adjust button for initiating adjustment according to preselected preference values; and
   an adjust reel height button for skipping to the height of cut adjustments (FIGS. 14-18).

The control systems of the invention includes an effective operator input station for precise and quick adjustment and/or re-tasking of reel units, particularly for multiple reel units that are usefully deployed on variable terrains of a golf course.

The controller 300 and/or the interface 306 make more feasible additional aspects of the invention. It would be useful to know how many times a reel has been sharpened to estimate the remaining life of the reel and/or bedknife. In this regard, the number of actuator registrations and/or calibrations of the reel-to-bedknife clearance for each reel unit can be recorded into controller memory or in a memory provided in the interface 306, designated for the particular reel unit. Alternately, a designated function, manual or automatic, for noting and recording each sharpening event, can be provided by the interface 306. This information can be operator-accessible via the interface 306.

By using the detector 320, the reel speed may be determined by counting the number of clicks per time period when the reel is making contact with the bedknife, or by sound monitoring during operation. The sound monitoring can be based on variations in sound pressure level or based on characteristics of the sound signal received by the detector 320, i.e., amplitude, frequency, etc. By using the sensor for speed sensing, it may be possible to eliminate the speed detection sensor 330 as a manufacturing cost savings.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A control system for a cutting reel unit comprising:
a first frame portion;
a second frame portion;
a cutting reel supported by said second frame portion;
a bedknife arranged adjacent to said cutting reel and supported by said second frame portion;
at least one support element arranged to translate along the ground and arranged to support said first frame portion;
at least one first actuator connected between said first frame portion and said second frame portion and arranged to adjust the relative elevation of said second frame portion with respect to said first frame portion to set a height-of-cut of said bedknife;

at least one second actuator operatively connected between said reel and said second frame portion and arranged to adjust a clearance between said reel and said bedknife; and a controller signal-connected to said first and second actuators; and an operator interface that is signal-connected to said controller, said operator interface comprising an operator input portion and a display portion, wherein said height-of-cut and clearance can be indicated on said display portion and said height-of-cut and clearance can be selectively changed by operator input to said operator input portion.

2. The control system according to claim 1, wherein said first and second actuators each comprise a stepper motor operatively associated with a lead screw mechanism driven to extend or retract by said stepper motor.

3. The control system according to claim 1, further comprising position sensors that are signal-connected to said controller, said position sensors determining the precise elevation of said reel with respect to the at least one support element and determining the position of said reel with respect to said bedknife.

4. The control system according to claim 3, wherein said sensors comprise optical encoders.

5. The control system according to claim 1 comprising a sound detector arranged in close proximity to said bedknife to detect touching between said cutting reel when spinning and said bedknife.

6. The control system according to claim 1, wherein said operator interface is permanently mounted with said controller to be transported with said cutting reel unit during operation.

7. The control system according to claim 1, wherein said clearance and said height-of-cut can be re-set to a predetermined value by the activation of a button on said operator input portion.

8. The control system according to claim 1, wherein said clearance and said height-of-cut can be selected from a list of selectable clearances and heights-of-cut displayed on said display portion using said operator input portion.

9. The control system according to claim 1, wherein said clearance and said height-of-cut can be selected from a list of selectable clearances and heights-of-cut displayed on said display portion using said operator input portion and can be manually changed by operator input to said operator input portion.

10. The control system according to claim 1, wherein said operator input portion includes reset buttons which calibrate the position of the first actuator and a measured height-of-cut.

* * * * *